(12) United States Patent
Matsueda

(10) Patent No.: US 8,973,003 B2
(45) Date of Patent: Mar. 3, 2015

(54) WORKFLOW MANAGEMENT SERVER AND METHOD

(75) Inventor: Kazutaka Matsueda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1942 days.

(21) Appl. No.: 12/115,910

(22) Filed: May 6, 2008

(65) Prior Publication Data

US 2008/0313634 A1 Dec. 18, 2008

(30) Foreign Application Priority Data

May 7, 2007 (JP) .................................. 2007-122796

(51) Int. Cl.
*G06F 9/46* (2006.01)
*G06Q 10/06* (2012.01)

(52) U.S. Cl.
CPC ...................................... *G06Q 10/06* (2013.01)
USPC ........................................................ 718/102

(58) Field of Classification Search
None
See application file for complete search history.

(56) References Cited

U.S. PATENT DOCUMENTS

| | | | | |
|---|---|---|---|---|
| 5,996,029 A | * | 11/1999 | Sugiyama et al. | 710/15 |
| 6,728,947 B1 | * | 4/2004 | Bengston | 717/103 |
| 7,180,623 B2 | * | 2/2007 | Kato | 358/1.15 |
| 2002/0131069 A1 | * | 9/2002 | Wanda | 358/1.14 |
| 2002/0161859 A1 | * | 10/2002 | Willcox et al. | 709/219 |
| 2003/0103236 A1 | * | 6/2003 | Kato | 358/1.15 |
| 2006/0039707 A1 | | 2/2006 | Mima | |
| 2008/0240827 A1 | * | 10/2008 | Yamazaki | 400/73 |

FOREIGN PATENT DOCUMENTS

| | | |
|---|---|---|
| JP | 10063751 A | 3/1998 |
| JP | 2003251892 A | 9/2003 |
| JP | 2004-208632 A | 7/2004 |
| JP | 2006058944 A | 3/2006 |

OTHER PUBLICATIONS

Office Action cited in corresponding Japanese patent application No. JP2007-122796, dated Dec. 2, 2011.

* cited by examiner

*Primary Examiner* — Gregory A Kessler
(74) *Attorney, Agent, or Firm* — Rossi, Kimms & McDowell LLP

(57) ABSTRACT

Even when an error has occurred in a device that is executing an activity, the workflow is continued as much as possible. When an error has occurred in an activity that is in progress in a device X, a server notifies the device X of an alternative device. The name of the alternative device (device Y) is displayed on the device X. The operator can send a job catalog request from the device Y to the server and select an aborted job from the provided job catalog. The server is notified of the selected job. When password authentication has succeeded, the device Y is permitted to continue the activity.

3 Claims, 26 Drawing Sheets

FIG. 6

| | 61 TERMINATION TYPE | 62 ADVANCING CONDITION TO NEXT ACTIVITY | 63 PRESENCE / ABSENCE OF DISPLAY | 64 MESSAGE 1 | 65 MESSAGE 2 |
|---|---|---|---|---|---|
| 66 | NORMAL TERMINATION | ALWAYS | PRESENT | PLACE THE PRINTED PRODUCT ON SHELF A | |
| 67 | PAPER OUT | ADVANCE WHEN 150 OR MORE PAPER SHEETS HAVE BEEN OUTPUT | PRESENT | PLACE PAGES 1 TO 15×N OF THE PRINTED PRODUCT ON SHELF A, AND KEEP THE REMAINDER ON THE TRAY | SUPPLY CONTRACT PAPER A |
| | | NO CONDITION EXCEPT ABOVE CASE | PRESENT | SUPPLY CONTRACT PAPER A | |
| 68 | TONER OUT | ADVANCE WHEN 150 OR MORE PAPER SHEETS HAVE BEEN OUTPUT | PRESENT | PLACE PAGES 1 TO 15×N OF THE PRINTED PRODUCT ON SHELF A, AND KEEP THE REMAINDER ON THE TRAY | (OUTPUT DEVICE-DEPENDENT ERROR) |
| | | NO CONDITION EXCEPT ABOVE CASE | DEVICE | (OUTPUT DEVICE-DEPENDENT) ERROR | |
| 69 | JAM | NO CONDITION | PRESENT | CLEAR JAM | PRINT FROM THE FIRST PAGE |
| 610 | STOP KEY PRESS | NO CONDITION | PRESENT | DISCARD THE OUTPUT PRODUCT | SELECT A JOB AGAIN |
| 611 | OTHERS | NO CONDITION | PRESENT | CALL THE SYSTEM ADMINISTRATOR | |

FLOW NAME : CATALOG    OPERATION NAME: PRINTING IN PROGRESS

CANCEL

84

PLACE PAGES 1 TO 300 OF THE PRINTED PRODUCT ON SHELF A, AND KEEP THE REMAINDER ON THE TRAY

OK

85

SUPPLY CONTRACT PAPER A

OK

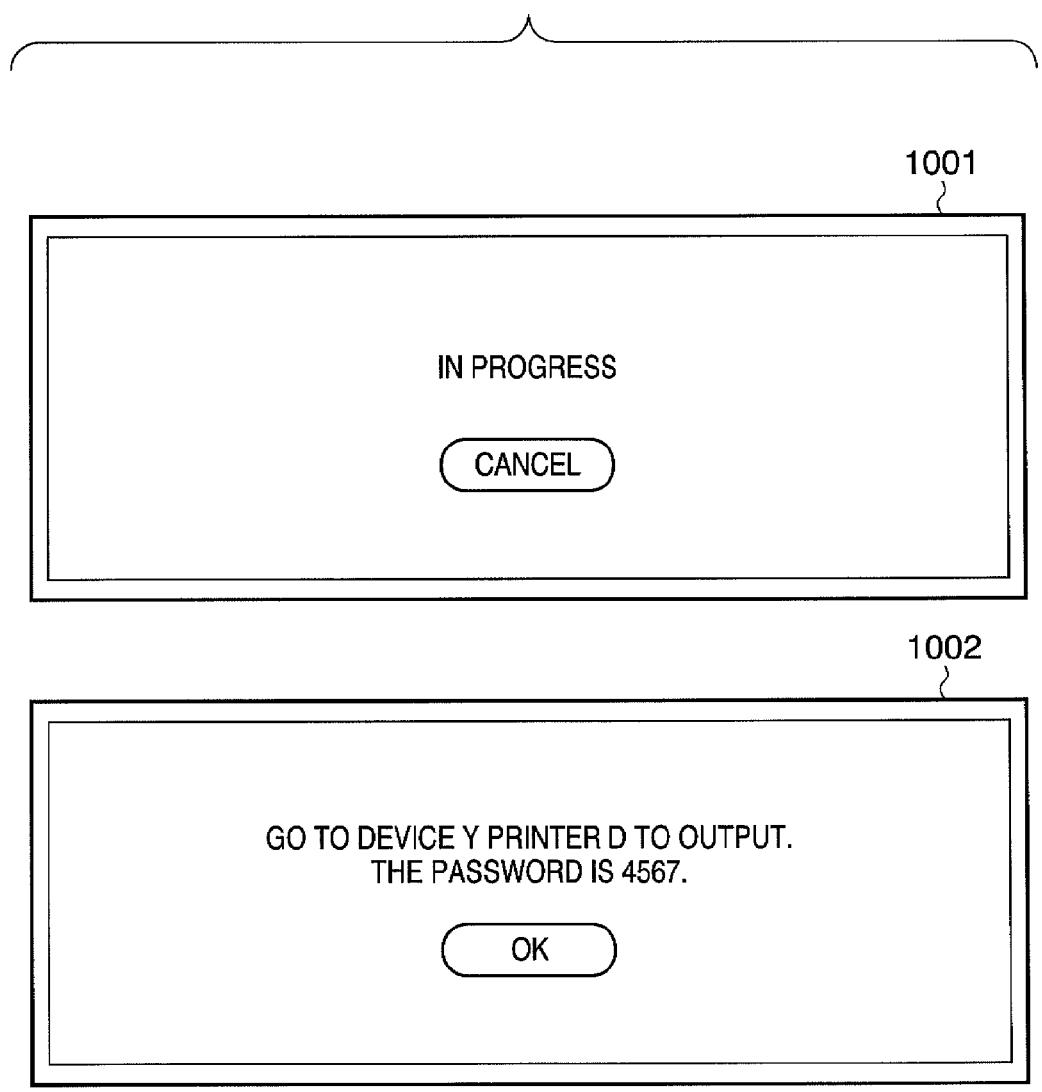

F I G. 10B

1003

| ID | STATUS | FLOW NAME | OPERATION | DEVICE IN CHARGE | FLOW START DATE | |
|----|--------|-----------|-----------|------------------|-----------------|---|
| 10 | ABORTED | MANUAL | PRINTING | PRINTER Y | 2005.06.10 | (SELECT) |
| 23 | NORMAL | CATALOG | PRINTING | PRINTER Z | 2005.06.11 | (SELECT) |
| 56 | NORMAL | MANUAL | PRINTING | PRINTER W | 2005.06.12 | (SELECT) |
| 72 | NORMAL | MANUAL | PRINTING | MONOCHROME PRINTER | 2005.06.10 | (SELECT) |

1004

INPUT PASSWORD
PASSWORD=****

(OK)

F I G. 11

| STATUS | MEANING |
|---|---|
| 1102 — NORMAL | NO PARTICULAR ERROR HAS OCCURRED |
| 1103 — ABORTED | PROCESSING IS ABORTED BECAUSE OF AN ERROR THAT HAS OCCURRED IN ANOTHER DEVICE |
| 1104 — PRINTING | ANOTHER DEVICE IS CURRENTLY EXECUTING PRINTING |
| 1105 — PROCESSING | THIS DEVICE IS CURRENTLY SELECTING AND EXECUTING PROCESSING |

FIG. 12

| | Termination Type (1201) | Advancing Condition to Next Activity (1202) | Presence/Absence of Display (1203) | Message 1 (1204) | Message 2 (1205) |
|---|---|---|---|---|---|
| 1206 | NORMAL TERMINATION | ALWAYS | PRESENT | PLACE THE PRINTED PRODUCT ON SHELF B | |
| 1207 | PAPER OUT | ADVANCE WHEN 100 OR MORE PAPER SHEETS HAVE BEEN OUTPUT | PRESENT | PLACE PAGES 1 TO 10×N OF THE PRINTED PRODUCT ON SHELF B, AND KEEP THE REMAINDER ON THE TRAY | SUPPLY CONTRACT PAPER A |
| | | NO CONDITION EXCEPT ABOVE CASE | PRESENT | SUPPLY A4 PAPER | |
| 1208 | TONER OUT | ADVANCE WHEN 100 OR MORE PAPER SHEETS HAVE BEEN OUTPUT | PRESENT | PLACE PAGES 1 TO 10×N OF THE PRINTED PRODUCT ON SHELF B, AND KEEP THE REMAINDER ON THE TRAY | |
| | | NO CONDITION EXCEPT ABOVE CASE | DEVICE | (OUTPUT DEVICE-DEPENDENT ERROR) | (OUTPUT DEVICE-DEPENDENT ERROR) |
| 1209 | JAM | NO CONDITION | PRESENT | CLEAR JAM | |
| 1210 | STOP KEY PRESS | NO CONDITION | PRESENT | DISCARD THE OUTPUT PRODUCT | PRINT FROM THE FIRST PAGE |
| 1211 | OTHERS | NO CONDITION | PRESENT | CALL THE SYSTEM ADMINISTRATOR | |

FIG. 13

| | TERMINATION TYPE | ADVANCING CONDITION TO NEXT ACTIVITY | PRESENCE / ABSENCE OF DISPLAY | MESSAGE 1 | MESSAGE 2 |
|---|---|---|---|---|---|
| 1306 | NORMAL TERMINATION | ALWAYS | PRESENT | PLACE THE PRINTED PRODUCT ON SHELF A | |
| 1307 | PAPER OUT | ABORT | PRESENT | GO TO DEVICE %D TO OUTPUT. THE PASSWORD IS %P. | |
| | ......... | ......... | ......... | ......... | ......... |

| MANAGEMENT DEVICE | IP ADDRESS | REMAINING PAPER COUNT | USE SCHEDULE | | DETAIL |
|---|---|---|---|---|---|
| A PRINTER | 172.20.20.20 | 540 | 9/20 | 13:00~16:00 | MACHINE IN 2F ROOM |
| B PRINTER | 172.20.20.21 | 100 | 9/21 | 15:00~17:00   18:00~22:00 | NO OPERATION PANEL |
| ...... | | | 9/20 | 13:00~16:00 | |
| | | | ...... | | |

| TERMINATION TYPE (2301) | ADVANCING CONDITION TO NEXT ACTIVITY (2302) | PRESENCE/ABSENCE OF DISPLAY (2303) | MESSAGE 1 (2304) | MESSAGE 2 (2305) |
|---|---|---|---|---|
| NORMAL TERMINATION (2306) | ALWAYS | PRESENT | PLACE THE PRINTED PRODUCT ON SHELF YYY | |
| PAPER OUT (2307) | NO CONDITION | PRESENT | PLACE THE PRINTED PRODUCT ON SHELF YYY | |
| TONER OUT | NO CONDITION | PRESENT | SUPPLY TONER | |
| JAM | NO CONDITION | PRESENT | CLEAR JAM | |
| STOP KEY PRESS | NO CONDITION | PRESENT | DISCARD THE OUTPUT PRODUCT | |
| OTHERS | | | | |

WORKFLOW MANAGEMENT SERVER AND METHOD

BACKGROUND OF THE INVENTION

1. Field of the Invention

The present invention relates to a workflow management server and method that can cause, for example, a server to manage a workflow and execute bookbinding printing.

2. Description of the Related Art

The standard of a workflow is defined by, for example, WfMC (Workflow Management Coalition). A workflow indicates automation of an overall business process or a part thereof. Using a workflow, a document, information, or task is taken over from one person in charge to another in accordance with a procedure rule. A workflow is executed by software that runs on one or a plurality of workflow engines. A workflow management system defines, generates, and processes a workflow. The workflow management system interprets definition data that defines a workflow and a processing step, interacts with the person in charge of the workflow, and activates an application program as needed.

A workflow is applied to various kinds of software and also used in, for example, a bookbinding print-on-demand (POD) system. In a mechanism such as a POD workflow, a workflow management system formed from a personal computer (PC) manages a workflow so that one operator executes, for example, bookbinding printing. A system has been proposed recently, in which a device such as a printer acquires and displays a job catalog from an order manager and receives job selection and an execution instruction (Japanese Patent Laid-Open No. 2004-208632). This provides a mechanism which causes a server to manage a workflow and makes an operator who is not busy execute only executable steps using an unoccupied device.

In the workflow management system according to the prior art, when an error has occurred in a device to execute a processing step, the display unit of the device displays a message to notify the operator of the error. The person in charge of the job executes an operation to remove the error. The workflow is aborted until the error is removed.

In some cases, however, even when the processing step executed by the device with the error is incomplete, the processing step of the next stage can be executed. Assume that the device is a print device which is executing a processing step of printing a plurality of copies of a printed product, and the processing step of the next stage is bookbinding of each copy. In this case, even when an error such as paper out, toner out, or breakdown occurs in the print device halfway during printing, already printed copies can be transferred to the next bookbinding processing step because the printing is done for each copy.

However, the person in charge of executing the processing step using the device cannot always make such a determination. In particular, an inexperienced operator executes an operation complying with contents displayed in case of an error. It is therefore difficult for him/her to apply a technique of, for example, advancing a processed portion to the next step. For this reason, the conventional workflow management system cannot execute the succeeding processing step before the aborted processing step. This may retard the workflow.

SUMMARY OF THE INVENTION

The present invention has been made in consideration of the above-described prior art, and has as its object to provide a workflow management server and method capable of efficiently advancing workflow processing even when a processing step is aborted.

In order to achieve the above object, the present invention has the following arrangement.

According to one aspect of the present invention, there is provided a workflow management server for managing a workflow including a plurality of processing steps to be sequentially executed by connected devices, comprising:

a message selector adapted to select a message corresponding to a termination type and a progress of a processing step, which are received from a device that is executing the processing step; and a first transmitter adapted to transmit the message selected by the message selector to the device, wherein if the termination type indicates abortion of the processing step by error of the device, the message selector selects the message to be transmitted from a first message representing advance to a next processing step and a second message to remove a cause of the abortion of the processing step in accordance with the progress, and wherein the first message and the second message are messages for the same error.

According to another aspect of the present invention, there is also provided a workflow management server for managing a workflow including a plurality of processing steps to be sequentially executed by connected devices, comprising:

an alternative device selector adapted to select an alternative device in accordance with a termination type and a progress of a processing step, which are received from a device that is executing the processing step;

a second transmitter adapted to transmit a job corresponding to a workflow including a processing step executable by the alternative device selected by the alternative device selector, in response to a job request received from the alternative device; and a third transmitter adapted to transmit a job selection permission notification to the alternative device in response to a job selection notification representing a job which is selected by the alternative device from the jobs transmitted by the second transmitter.

According to the present invention, it is possible to efficiently execute workflow processing even when a processing step is aborted.

Further features of the present invention will become apparent from the following description of exemplary embodiments with reference to the attached drawings.

BRIEF DESCRIPTION OF THE DRAWINGS

FIG. 6 is a view showing an activity error definition table according to the present invention;

FIGS. 8A and 8B are views showing the display transition of the display unit of the device according to the present invention;

FIGS. 10A and 10B are views showing a display example in resuming an aborted job;

FIG. 11 is an explanatory view of statuses to be displayed on the panel of the device;

FIG. 12 is a view showing another example of the activity error definition table;

FIG. 13 is a view showing an example of designation of a variable printer name and a variable password;

FIG. 14 is a view showing a device management table managed by the server;

FIG. 23 is a view showing an example of the activity error definition table in a job for printing pages.

DESCRIPTION OF THE EMBODIMENTS

First Embodiment

Outline of Workflow

Figure 1:
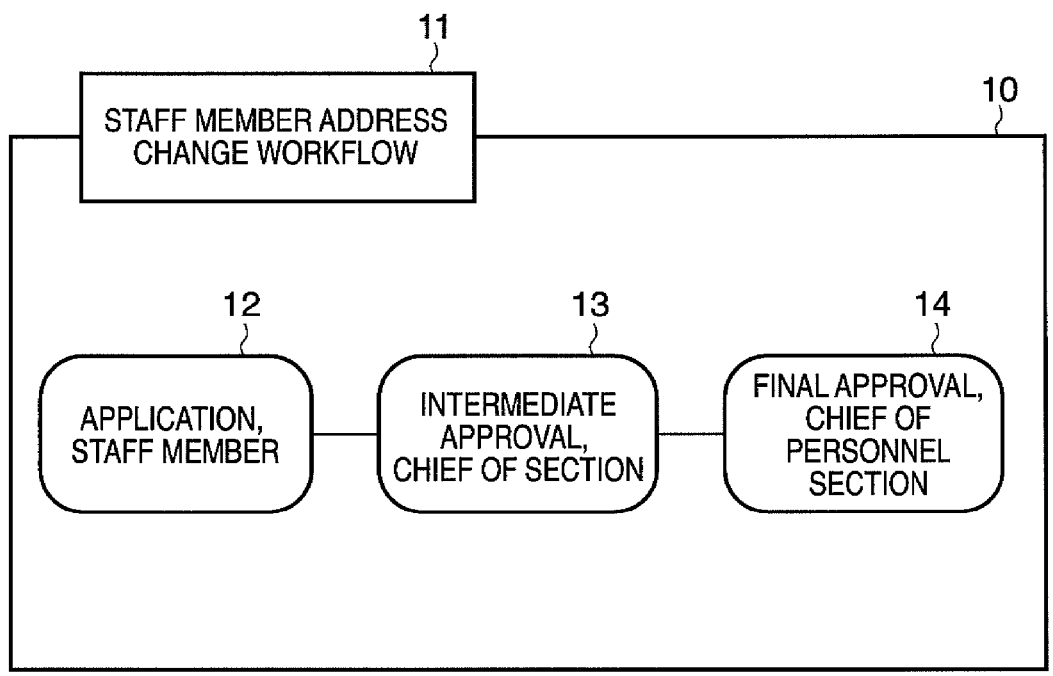
FIG. 1 is a schematic view of a standard workflow.

An embodiment of the present invention will now be described in detail with reference to the accompanying drawings. FIG. 1 is a schematic view showing the concept of a standard workflow. Referring to FIG. 1, a workflow 10 has a title portion 11, "staff member address change workflow". An activity 12 indicates that a staff member performs an application operation. An activity indicates a processing step included in the workflow. When the operation of the activity 12 has terminated, an activity 13 starts. In the activity 13, the chief of the section performs intermediate approval processing. When the activity 13 has terminated, an activity 14 is executed. The activity 14 is final approval to be performed by the chief of the personnel section. The activities 12, 13, and 14 indicate the individual processing steps included in the workflow 10. An activity includes operation contents to be executed and a group of persons in charge. A group of persons in charge which is defined to be able to execute an activity is particularly called a role. A set of one or a plurality of activities to be executed time-serially is called a workflow. In some cases, a plurality of activities are executed asynchronously.

An activity is defined by, for example, an identifier, a role, and the like. A workflow can be represented by, for example, its identifier (name) and data formed by arranging the identifiers of work items time-serially. The staff member address change workflow 10 shown in FIG. 1 starts from the application activity 12 by a staff member. Then, the intermediate approval activity 13 by the chief of the section is performed, and finally, the final approval activity 14 by the chief of the personnel section is executed.

Figure 2:
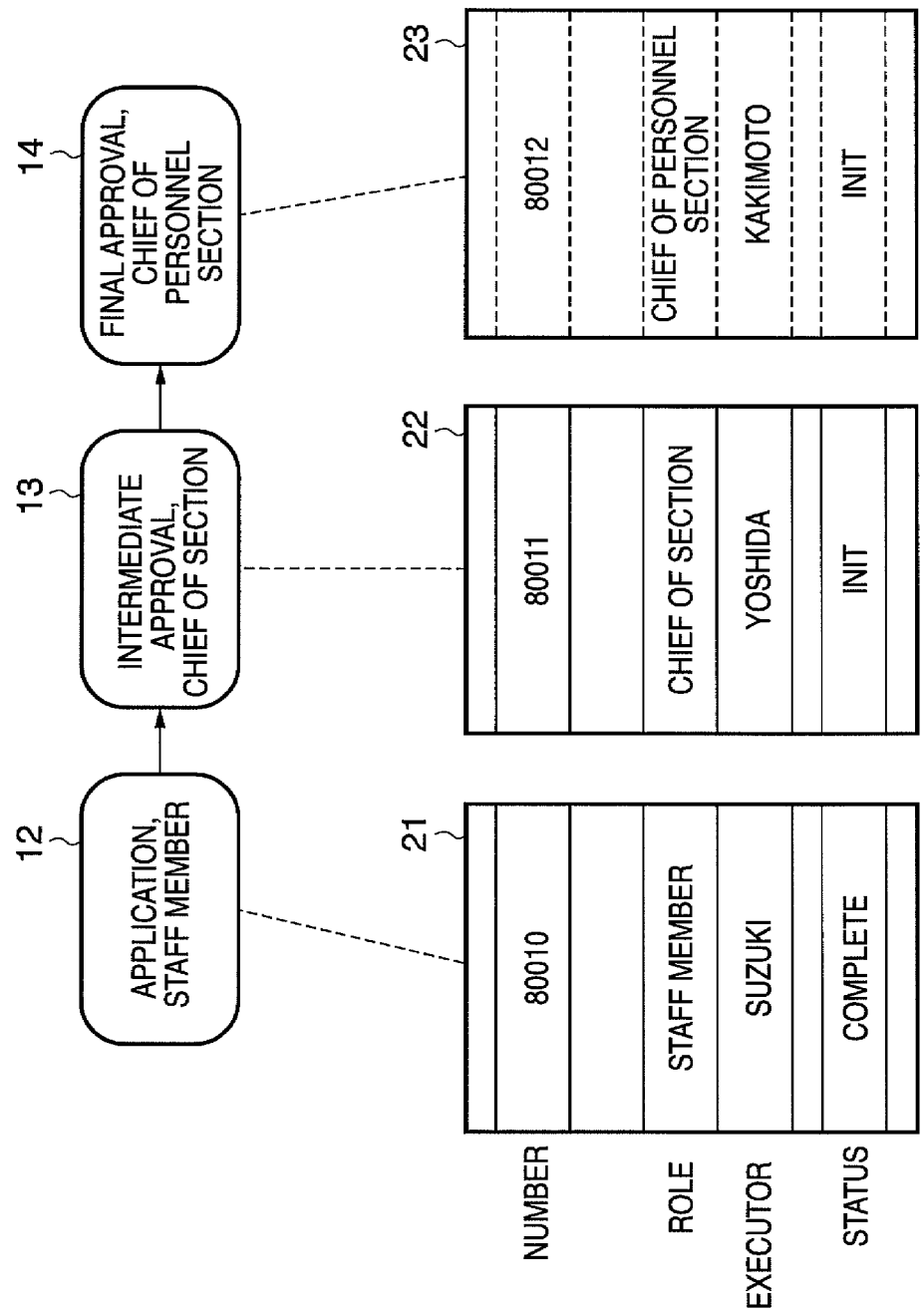
FIG. 2 is an explanatory view of work items.
Figure 21:
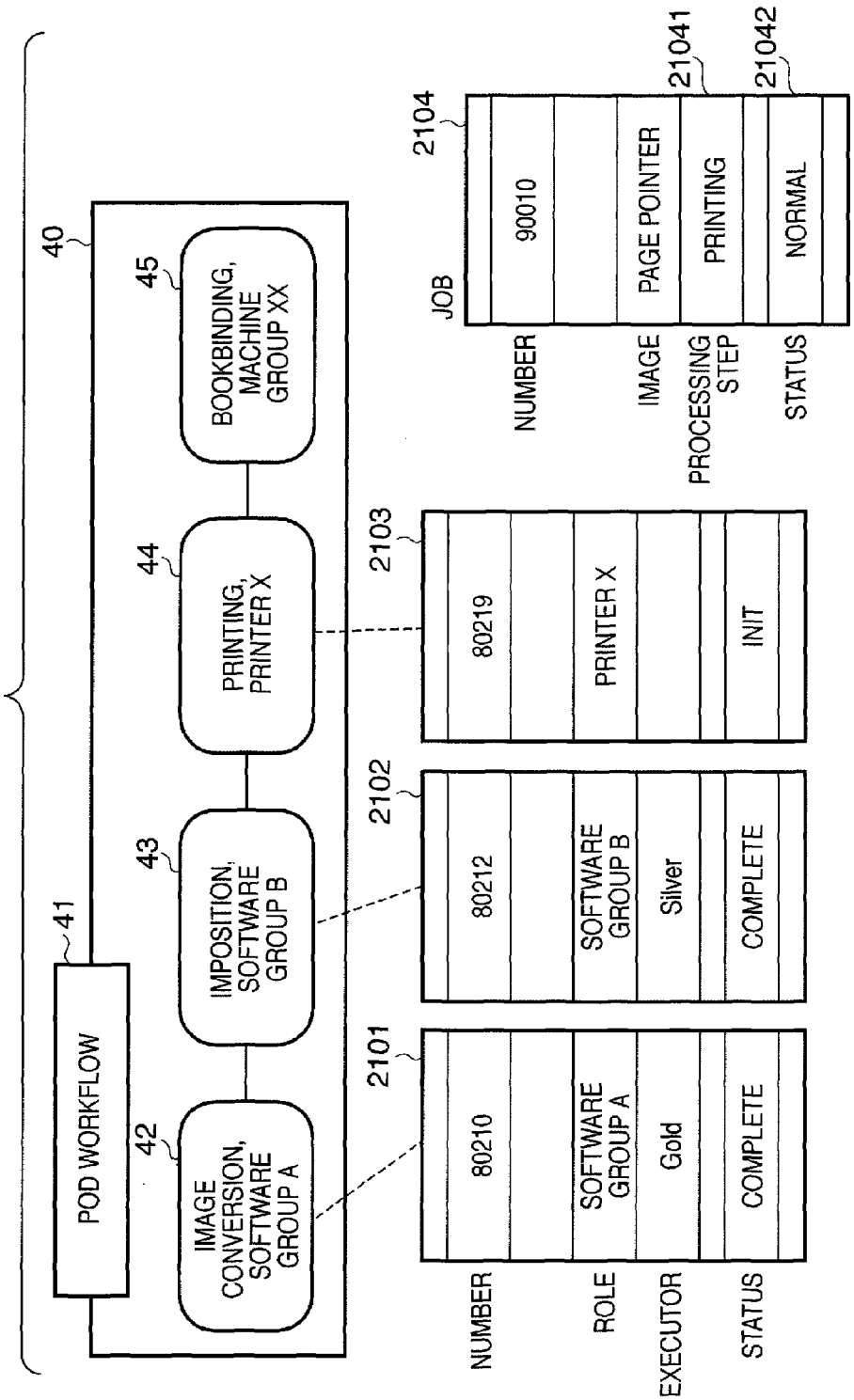
FIG. 21 is a schematic view of work items in a POD workflow.

FIG. 2 is a schematic view of a workflow operation. Normally, anyone who fits to a role based on a definition can execute a workflow. More specifically, when the role of the activity 12 is defined as "staff member" in the workflow shown in FIG. 1, any staff member can change his/her address in accordance with the flow. FIG. 2 shows an operation example when a staff member "Suzuki" makes an application. In FIG. 2, the statuses of the activities 12 to 14 are indicated by corresponding work items 21 to 23, respectively. When the processing of an activity starts, a work item is generated. The name of the executor is described in the executor field of the work item. When the activity has terminated, the completion status is described in the status field. The role and identifier contained in each work item are obtained from activity definition information that defines the activity. Processing to be executed by activities in accordance with a workflow is called a job. Generally, jobs and workflows have a one-to-one correspondence. Hence, for example, selecting a job is equivalent to selecting a workflow. FIG. 21 shows a job 2104. The job is information representing the status of a workflow and is stored in association with the workflow. The job includes a unique number, a pointer to data or a parameter to be processed by the workflow, a processing step that is being executed presently, and the status of the workflow. The processing step that is being executed presently corresponds to the contents of the activity in progress. When an activity is completed, and the process waits for execution of the next activity, the next activity is stored as the current processing step. The status of the workflow is "normal" if no error has occurred, or a normal status has been restored by removing an error.

FIG. 2 shows a state in which the activity 12 has terminated, and the activity 13 is progressing. Since the status field of the work item 22 corresponding to the activity 13 indicates "INIT", the next activity 14 has not started. That is, the work item 23 has not been generated yet in the state in FIG. 2. The status of a work item is normally "INIT", "OPEN", or "COMPLETE". "INIT" indicates that the operation has occurred. "OPEN" indicates that the operation execution authorization has been acquired. "COMPLETE" indicates that the operation has terminated. The work item 23 is generated when the work item 22 has terminated, and the operation of the activity 14 has started. The work item number (identifier) of the work item 21 is "80010". The role is "staff member", the executor is "Suzuki", and the status is "COMPLETE". In the work item 22, the number is "80011", the role is "chief of the section", the executor is "Yoshida", and the status is "INIT". In some cases, the executor is defined before the actual start of the operation, like the work item 22. This is because when the executor of the work item 21 is "Suzuki", his/her chief "Yoshida" is automatically selected as the executor of the next activity 13. Generally, when only one member belongs to the role, the executor is selected before the start of the activity. This is because the executor is uniquely determined. Hence, if there is only one chief of the personnel section, the work item 23 is generated before the start of the activity 14 by defining "80012" as the number, "chief of the personnel section" as the role, "Kakimoto" as the role, and "INIT" as the status. The work item 23 which has not occurred yet is indicated by broken lines in FIG. 2.

<POD Workflow>

Figure 3:
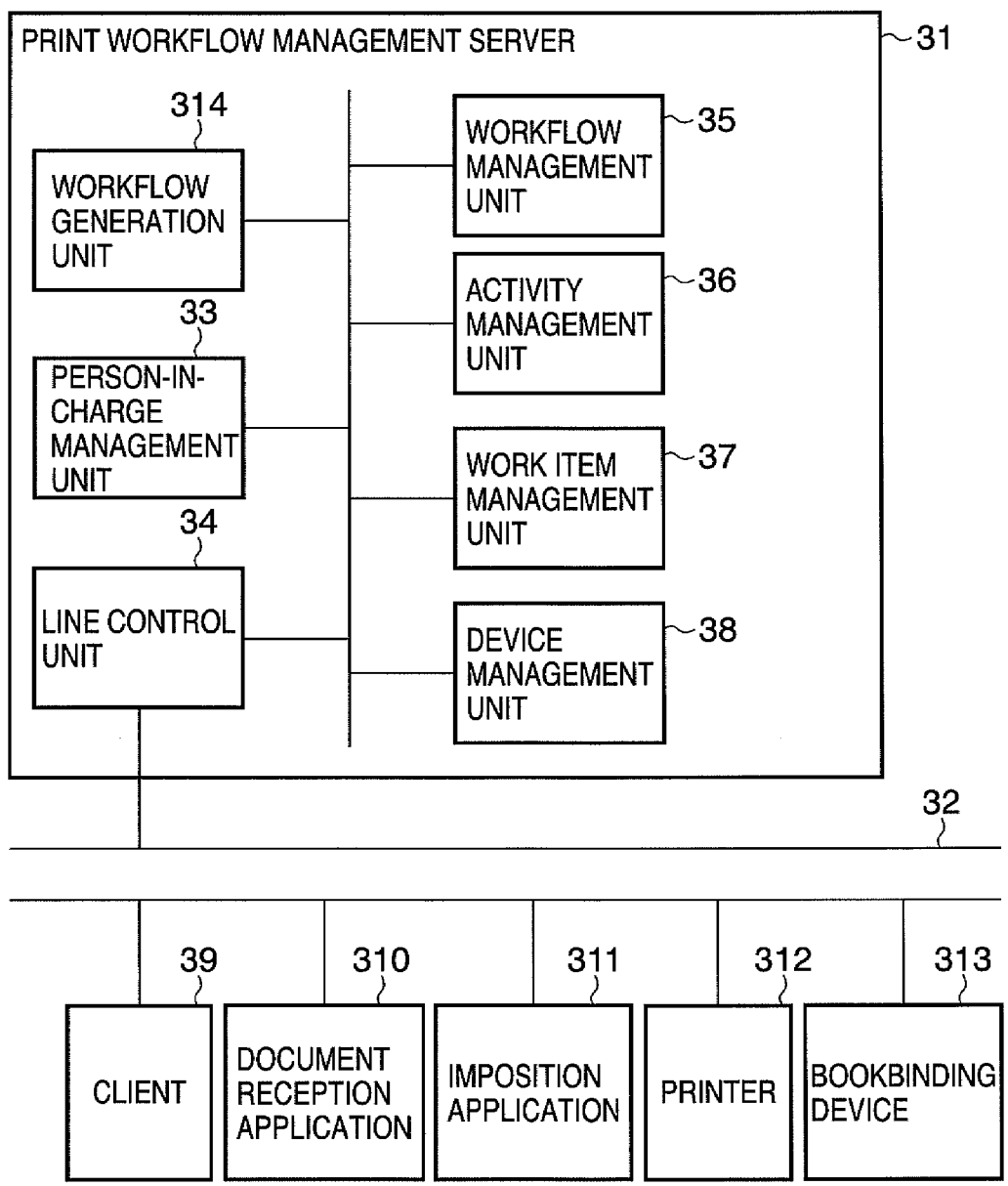
FIG. 3 is a block diagram showing the schematic arrangement of a POD workflow printing system.

FIG. 3 is a block diagram showing the schematic arrangement of a POD workflow processing system according to the first embodiment of the present invention. In the POD workflow, a hardware resource including a computer and a printer executes activities. When the devices for executing the activities are connected to a workflow management server via a network, the devices connected via the network sequentially execute the activities of the workflow. However, the operation of hardware resource or transport of a product generated by activities is sometimes performed manually.

Referring to FIG. 3, a workflow management server 31 is a print workflow management server which functions as a POD workflow management server to generate a workflow or manage execution of a workflow. The print workflow management server 31 includes a person-in-charge management unit 33, line control unit 34, workflow management unit 35, activity management unit 36, work item management unit 37, device management unit 38, and workflow generation unit 314. A line unit 32 is the Internet or an intranet, which connects the print workflow management server 31 to devices for executing activities.

The person-in-charge management unit 33 manages, for example, the role information of each activity. The person-in-charge management unit 33 stores a role configuration table which associates, for example, a role identifier with a corresponding member as role information. The line control unit 34 communicates with another device or PC via the line unit 32. The workflow management unit 35 manages workflow information that defines various kinds of workflows generated by the workflow generation unit 314. Workflow information contains, for example, the name of a workflow, the identifiers of activities to manage the workflow, and information representing the order of the activities. The activity management unit 36 manages information (to be referred to as activity information) individually provided for each activity of a workflow. The activity information includes static information that forms a workflow, and dynamic information that is generated after the start of the workflow operation. The static activity information contains information about a role capable of executing the activity, the processing contents of the activity, and the name of the workflow to which the activity belongs in association with, for example, the identifier of the activity. The activity management unit 36 also stores and manages an activity error definition table to be described later.

The work item management unit 37 generates and manages a work item corresponding to each activity after the start of the workflow operation. The work item management unit 37 manages, for example, a generated work item itself, or operation contents concerning a work item. The work item management unit 37 also functions as a transmission unit for transmitting a message or a job (to be described later). As the function related to transmission, the work item management unit 37 has a first transmission function of transmitting a selected message, which is executed in step S76 of FIG. 7 (to be described later). The transmission function also includes a second transmission function (S93) of transmitting a job corresponding to a workflow including a processing step executable by an alternative device, and a third transmission function (S98) of transmitting a job selection permission notification to an alternative device. The transmission function further includes a fourth transmission function (S96) of transmitting the identifier of an alternative device and a password to be input to the alternative device and storing the password. The device management unit 38 manages the devices to be used by the POD workflow processing system. The device management unit 38 stores information representing the use states and use schedules of, for example, a printing device, PC, and bookbinding device usable by the POD workflow processing system and the remaining amounts of consumables such as printing paper sheets in each device and updates the information in accordance with the state of each device. The workflow generation unit 314 which is normally accessed by a client 39 via the HTTP provides an editor function that runs on, for example, a web browser of the client 39. The workflow generation unit 314 generates a workflow as shown in FIG. 1 in accordance with the editing operation of the user who uses the editor function. The generated workflow is information including a name and activities. After generation, the workflow is stored, updated, and executed by the workflow management unit 35.

The client 39 is a client apparatus such as a personal computer (PC) which communicates with the print workflow management server 31. The client 39 can refer to information provided by the print workflow management server 31 using, for example, a web browser. In this embodiment, a user logs in to the server using the client 39 serving as a terminal and starts a workflow by operating, for example, a button on a web screen that is provided to the login user by the print workflow management server 31. The client 39 can also display work items processable by the login user.

A document reception application 310 is software which implements document reception in the POD workflow processing system. The document reception application 310 receives, for example, an output request of an electronic file or a paper document from a client, digitizes the output target document, as needed, and stores it. The document reception application 310 may have a function of converting the file format of a received electronic file, as needed. The document reception application 310 can run either on the client 39 or on another PC different from the client 39. In this embodiment, the document reception application 310 is executed on another PC different from the client 39.

An imposition application 311 is software which designates the form of a printed product in the POD workflow processing system. The operator can designate an output form such as double-sided printing or saddle stitching for a received electronic file using the imposition application 311. The imposition application 311 can run either on the client 39 or on another PC on the network. The imposition application 311 may be implemented as an application integrated with the document reception application 310. In this embodiment, the imposition application 311 is executed on another PC different from the client 39.

A printer 312 executes printing in the POD workflow processing system. The printer 312 can be either a standalone printer or a multifunctional peripheral (MFP) having a plurality of functions including a facsimile function. A bookbinding device 313 executes bookbinding processing of printing paper sheets output from the printer 312. An example of bookbinding is case binding. The bookbinding device 313 includes an in-line bookbinding device which is integrated with the print device 312 and conveys and binds discharged printing paper sheets, and a near-line bookbinding device which is connected to the line unit 32 but separated from the print device 312. There is also an off-line bookbinding device serving as an off-line device that is not connected to the print device 312. In this embodiment, the near-line bookbinding device is used as the bookbinding device 313.

Figure 4:
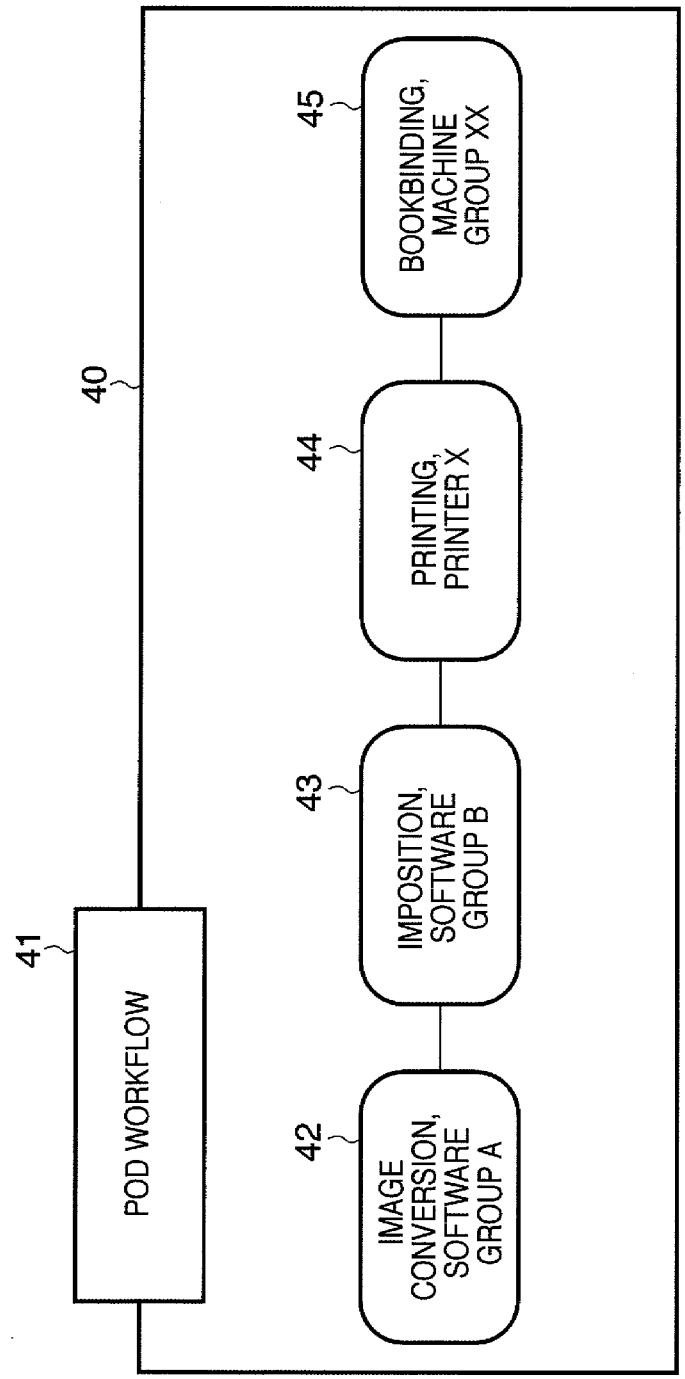
FIG. 4 is a view showing a definition example of a POD workflow.

FIG. 4 shows a definition example of a POD workflow. The name of a workflow 40 is described in a title portion 41. In this example, the name is "POD workflow". An activity 42 is image conversion, and a software group A is designated as the role. That is, the activity 42 performs image conversion. PCs and software belonging to the software group A are permitted to execute the image conversion. An activity 43 is imposition, and a software group B is designated as the role. That is, the activity 43 performs imposition. PCs and software belonging to the software group B are permitted to execute the imposition. An activity 44 is printing, and a printer group X is designated as the role. That is, the activity 44 performs printing. Printers belonging to the printer group X are permitted to execute the printing. If there is a plurality of printers having a function capable of a requested output, the printer group X includes the printers, as shown in a role configuration table in FIG. 5. An activity 45 is bookbinding, and a bookbinding machine group XX is designated as the role. That is, the activity 45 performs bookbinding. Bookbinding devices belonging to the bookbinding machine group XX are permitted to execute the bookbinding. The workflow 40 is generated by the workflow generation unit 314 and managed by the workflow management unit 35.

Figure 5:
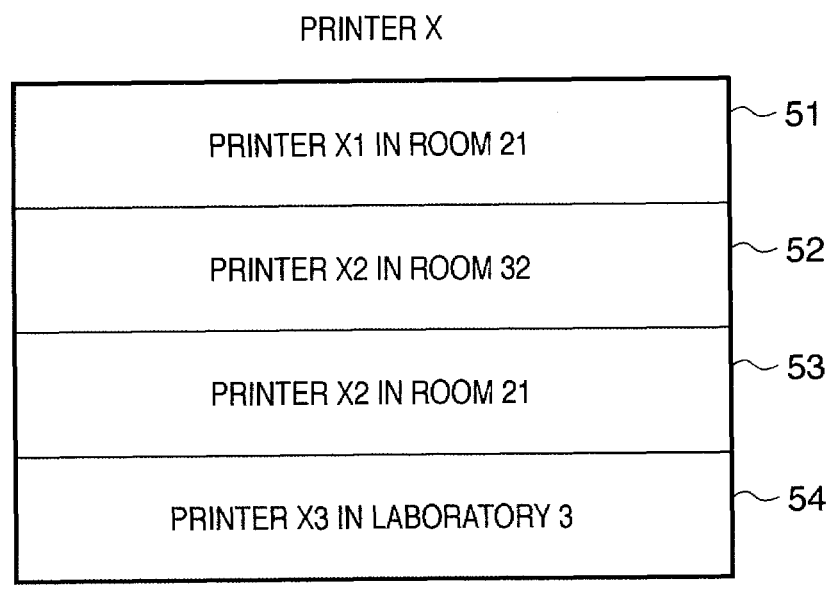
FIG. 5 is an explanatory view of the role of an iR 5500 group according to an embodiment.

FIG. 5 is a view showing an example of the printer group X defined as the role of the activity 44. The "printer group X" is a set of four devices from a printer X1 51 to a printer X3 54. The printer X1 51 is a printer X1 located in room 21. Similarly, a printer X2 52 is a print device located in room 32, a printer X2 53 is a printer X2 located in room 21, and the printer X3 54 is a printer X3 located in laboratory 3. These devices are uniquely determined in the rooms and laboratory. If two or more printers of the same type exist in one room, they are discriminated by, for example, identifiers. Note that the "printer group X" is merely a name, and any device other than printers X can also be registered if it can execute the activity 44.

<Activity Error Definition Table>

FIG. 6 is a view showing an example of an activity error definition table according to the present invention. The activity error definition table is defined as information about an activity at the time of workflow generation and managed by the activity management unit 36. One activity error definition table is defined in correspondence with one activity of each workflow. An activity error definition table 60 defines measures against errors in a "printing" activity in a workflow for printing 100 copies of a printed product which has 15 pages per copy. "Termination type" 61 represents the termination types of the printing activity. "Advancing condition" 62 describes conditions to advance to the next activity. "Display information" 63 includes information representing the presence/absence of display information. If "present" is contained in the display information 63, it indicates that information to be displayed on the panel of a device exists. A message 64 is information representing a message string to be displayed on a device. A message 65 represents a message to be displayed on the device next to the message defined by the message 64. The fields are defined for each termination type. When the termination type is "normal termination", the activity of the next stage is executed unconditionally, and therefore, no specific condition is registered in the activity error definition table.

When the termination type 61 is "normal termination" 66, the advancing condition 62 is "always" which indicates that the workflow advances to the next activity unconditionally. In this case, the message 64 "Place the printed product on shelf A" is displayed on the device.

When the termination type 61 is "paper out" 67, "printing of 150 or more sheets" is defined as the advancing condition 62. If 150 or more printing paper sheets have been output, the workflow advances to the next activity. On the other hand, if 150 or more printing paper sheets have not been output yet, the printing activity is aborted. To advance to the next activity, the print workflow management server 31 displays, on the device, message 1 "Place pages 1 to 15×N of the printed product on shelf A, and keep the remainder on the tray" and message 2 "Supply contract paper A". A value obtained by multiplying the number of printed copies by the number of pages per copy is substituted into "15×N" of the message. Assume that 183 sheets have been output, and the printing is being done for each copy. In this case, the number N of copies is 183/15=12, and 15×12=180 is displayed in place of "15×N". This is because pages 1 to 180 can undergo bookbinding of the next activity. The method of switching the two messages depends on the device. For example, the second message is displayed 10 sec after display of the first message. Alternatively, the second message is displayed by pressing a button after display of the first message. If the paper has run out before 150 sheets are printed, and the workflow cannot advance to the next activity, a message "Supply contract paper A" is displayed. This example assumes that printing is performed using preprinted contract paper A.

When the termination type 61 is "toner out" 68, "printing of 150 or more sheets" is defined as the advancing condition. If 150 or more printing paper sheets have been output before the toner runs out, the workflow advances to the next activity. On the other hand, if 150 or more printing paper sheets have not been output yet, the printing activity is aborted. To advance to the next activity, a message "Place pages 1 to 15×N of the printed product on shelf A, and keep the remainder on the tray" and a message such as "Supply toner" are displayed on the device. A value obtained by multiplying the number of printed copies by the number of pages per copy is substituted into "15×N" of the message. The method of switching the two messages depends on the device. If the toner has run out before 150 sheets are printed, and the workflow cannot advance to the next activity, a message such as "Supply toner" is displayed depending on the device. This example assumes that an electrophotographic printer is used.

When the termination type 61 is "jam" 69, no advancing condition 62 is defined, and the activity is aborted in that state. Additionally, two messages are output. Message 1 is "Clear jam", and message 2 is "Print from the first page". In this example, the workflow designer designs the workflow to output from the first page again in case of a jam.

When the termination type 61 is "stop key press" 610, no advancing condition 62 is defined, and the activity is aborted in that state. Additionally, two messages are output. Message 1 is "Discard the output product", and message 2 is "Select a job again". In this example, since the user designates a job to be executed on the panel of the print device, a screen for prompting the user to select a job is displayed.

When the termination type 61 is "others (except those aforementioned)" 611, no advancing condition 62 is defined, and the activity is aborted in that state. A message "Call the system administrator" is output.

Preparing such an activity error definition table for each activity allows changing a message to be displayed on a device for each workflow. It is also possible to display an appropriate message upon error occurrence in accordance with the situation of the error.

In this embodiment, an error table associated with a printing activity has been described. However, an activity error definition table can be defined for any other activity. For example, an activity error definition table for a bookbinding activity can define measures against errors that take place during processing of a bookbinding device. Not only for a hardware failure but also for a software failure that occurs in, for example, a document reception activity or an imposition activity executed by software, a process advancing condition or a message corresponding to the software failure can be defined. As described above, the activity error definition table stores a plurality of kinds of messages to be transmitted in accordance with the progress.

<Activity Pull Execution Procedure by Device>

Figure 7:
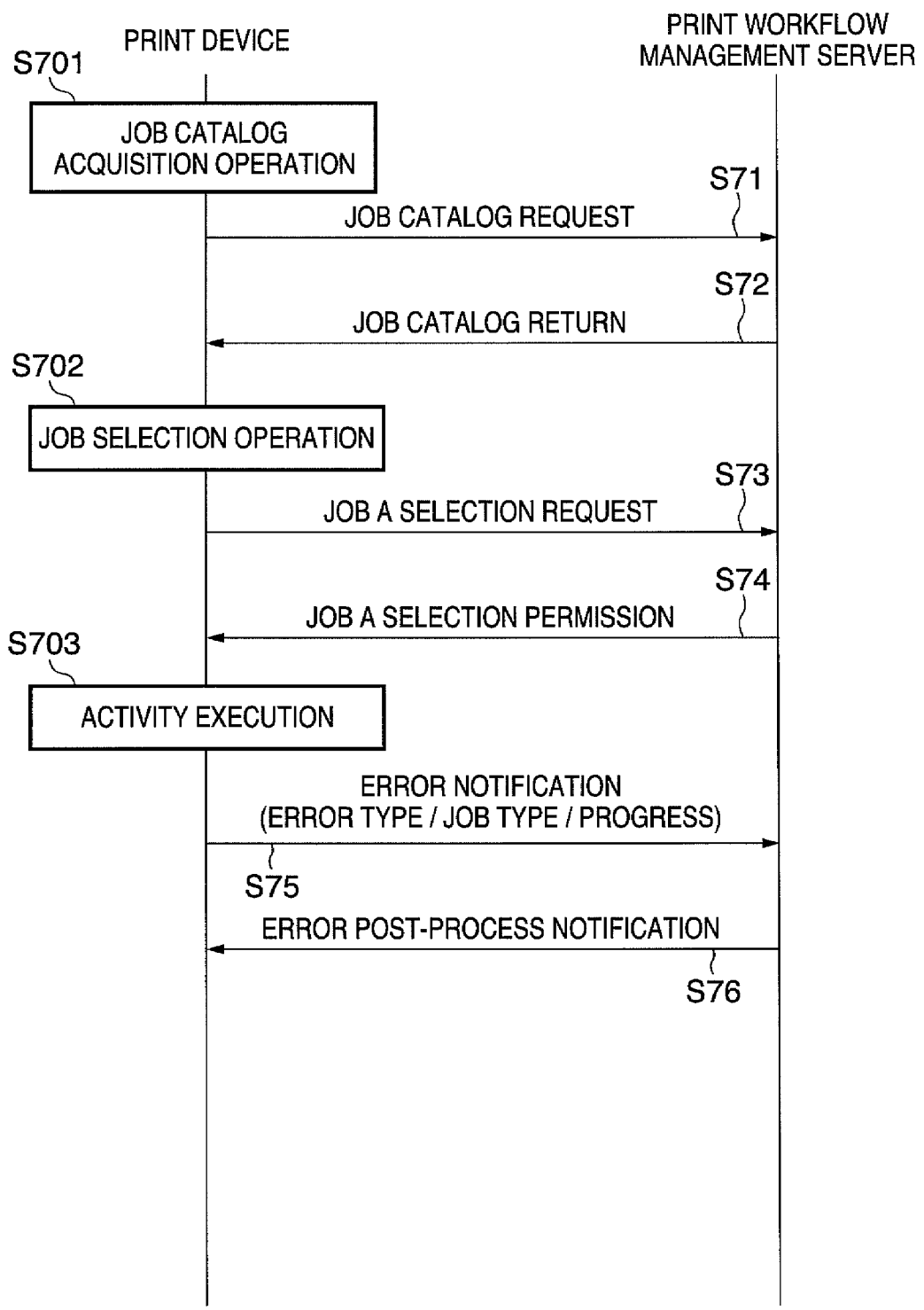
FIG. 7 is a sequence chart showing the communication sequence between a device and a server according to the present invention.
Figure 24:
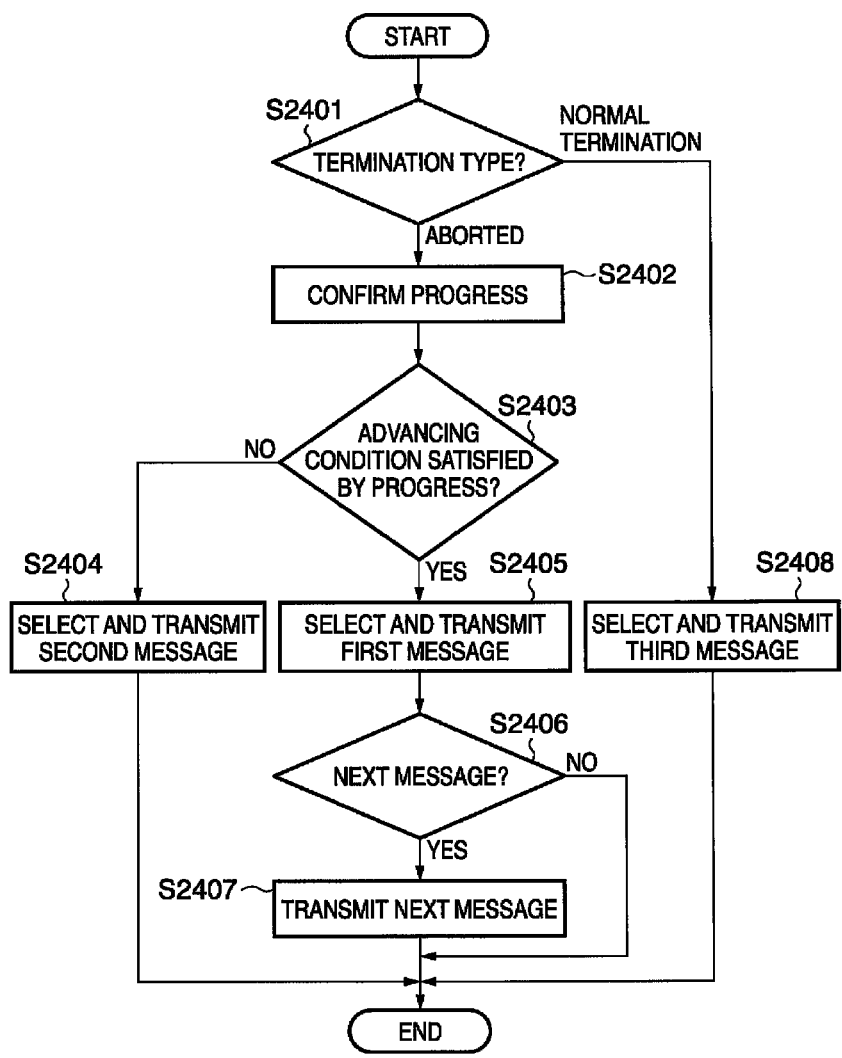
FIG. 24 is a flowchart illustrating the sequence upon command reception by the server according to the present invention.

FIG. 7 is a sequence chart showing the communication sequence between the print device 312 (to be referred to as a device) and the print workflow management server 31 (to be referred to as a server) according to the present invention. FIG. 7 explains the arrangement of pull printing that is executed by acquiring a job from the print workflow management server 31 in accordance with a user operation on the print device 312. FIG. 24 shows the detailed operation of the print workflow management server 31.

In step S71, the device issues a job catalog request to the server to request a catalog of jobs executable by the device in accordance with a job catalog acquisition request input in step S701. Upon receiving the request in step S71, the server transmits a catalog of jobs executable by the device in step S72 with reference to workflow information, role information, and work items. Activities executable by the device indicate, of unexecuted activities for which a group including the device as a member is defined as the role, activities whose preceding-stage activities have normally terminated. For the executable activities, associated work items are also generated. Hence, the executable activities can be searched for based on the work items. The work items of the executable activities may be transmitted to the device as the job catalog. If an activity has not normally terminated but satisfies the progress state defined as the advancing condition in the activity error definition table, the activity of the next stage is determined to be executable. The server searches for unexecuted activities for which a group including the device of the job catalog request source as a member is defined as the role from workflow information stored in the workflow management unit. Whether an activity is unexecuted or not can be determined by referring to the work item associated with the activity. The server refers to the work item of the activity before an unexecuted activity, and if the state is "complete", determines that the activity is executable. Alternatively, the server refers to the status field of the work item of the activity before an unexecuted activity, and if the state is not "complete", searches the activity error definition table using the value in the status field. If the state obtained from the work item satisfies the advancing condition defined in the activity error definition table, the activity of interest is an executable activity even if the preceding-stage activity has terminated due to an error.

Upon receiving the job catalog in step S72, the device displays executable job catalog information on the panel and prompts the user to select an operation. The job catalog includes the identifier and state of each job, a corresponding workflow name, the identifier of each group assigned as the role of an activity which is being executed or is to be executed, and the start date of each flow. The device selects a job in accordance with an instruction from the user (S702) and sends selection information representing the selected job to the server (S73). The server receives the selection information, executes various kinds of check and job status change, generates a work item associated with the activity and sends an execution permission (also called a selection permission) of the selected job (S74). The status of the job is described in a job status field 21042 shown in FIG. 21. For example, the activity management unit 36 stores and maintains the status. Upon receiving the execution permission, the device executes the permitted job (S703). More specifically, the device executes the execution target activity in the selected workflow. In step S75, the device transmits an activity termination notification. The termination notification contains an activity termination type and progress information representing the situation of termination. The progress information includes information representing, for example, the number of printed sheets. The server receives the activity termination notification, searches for the information of the processed activity or workflow information including the activity, and obtains a corresponding activity error definition table. The server searches the activity error definition table for an advancing condition corresponding to the termination type received from the device, and if a corresponding advancing condition is found, compares it with the progress received from the device. If the progress received from the device satisfies the advancing condition acquired from the activity error definition table as a result of comparison, the process advances to the next activity in accordance with the advancing condition. If a message to be displayed on the device is present, the server selects the message and transmits, to the device, the selected message contained in error post-process notification information (S76). The message selection corresponds to the message selection step and the message selector. If the termination type is "normal termination", the process advances to the next activity without referring to the activity error definition table. At this time, the server selects a third message that explains how to handle a processed portion in the completed processing step.

The above sequence allows the server side to transmit display information to be displayed on the device and allows the device to execute processing according to the result or progress of the workflow. In this example, a plurality of messages can be input in step S76. However, the device may send a message request to the server, and the server may return a message to be displayed one by one.

Figure 8A:
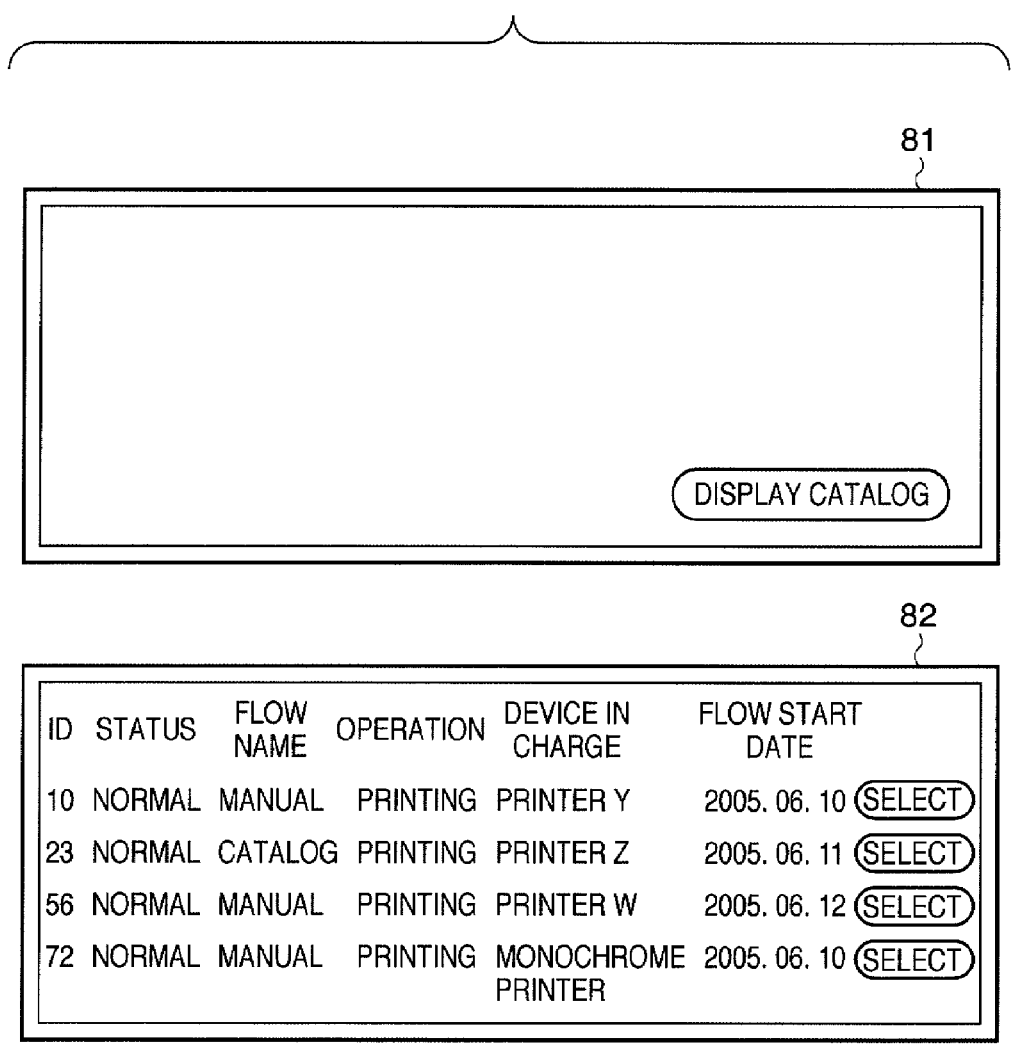

FIGS. 8A and 8B are views showing the display transition of the display unit of the device according to the present invention. A display example 81 indicates display on the device panel formed from an LCD or the like. A catalog display button to transfer to operation catalog display is displayed. When the user presses the catalog display button in the screen 81, the signal in step S71 is transmitted to the server. As a result, the device receives a job catalog in step S72, and the display transfers to a display example 82. The display example 82 indicates job catalog display including items "ID", "status", "flow name", "operation", "device in charge", and "flow start date". Four jobs are displayed in the screen. A job with a job identifier (ID in FIG. 8A) "10" has a status "normal" which indicates that the workflow has progressed normally up to this step. Details of the status will be described later with reference to FIG. 11. The workflow name is "manual". The role (device in charge) capable of executing the operation is a Y printer group. The activity is "printing". The screen 82 shows that the flow start date is Jun. 10, 2005. A selection button is displayed at the right end. When the user selects the button, the selection information of the job is transmitted to the server in step S73. This also applies to the remaining jobs.

Upon receiving job operation permission from the server in step S74, the device displays a display example 83. In this example, a description will be made assuming that a job with an ID "23" is selected. In the display example 83, "catalog" is displayed as the workflow name and "printing" is displayed as the operation name. A message "Processing in progress" is displayed to indicate that the operation is progressing. A cancel button to terminate the operation is also displayed. When the user presses the cancel button, the printing operation is ended.

A display example 84 indicates that a "paper out" error has occurred after 302 pages have been output during execution of the job. If an event including normal termination has occurred, a termination notification is transmitted to the server in step S75. In step S75, a termination type (including at least completion of the processing step and abortion of the processing step), job type, and progress information are transmitted, as described above. In this example, the progress information includes information representing that printing is completed up to page 302. In step S76, the server transmits messages "Place pages 1 to 300 of the printed product on shelf A, and keep the remainder on the tray" and "Supply contract paper A" to the device in accordance with the activity error definition table in FIG. 6. That is, if the termination type indicates abortion of the processing step, the workflow management server selects, as a message to be transmitted, the first message representing that the processed portion in the aborted processing step should advance to the next step in accordance with the progress. The device receives an error post-process notification in step S76 and transfers to a display example 84. Pressing an OK button in the display example 84 triggers transfer to a display example 85. The user can display all messages contained in the notification received in step S76 by repeatedly pressing the OK button. After all messages are displayed, the standby screen of the device is displayed. The display example 85 is displayed even when the progress does not satisfy the advancing condition to the next activity in the activity error definition table. That is, the workflow management server 31 selects the second message to remove the cause of the abortion of the processing step.

The processing of the workflow management server will be described here with reference to FIG. 24. The server 31 determines whether a received command indicates a termination type (S2401). The server 31 determines in step S2401 whether the received command includes "complete" or "aborted" as the termination type of a processing step, thereby implementing the determination step in step S2401.

Upon determining that the termination type is "complete", the server 31 executes a measure for "normal termination" by referring to the activity error definition table (S2408).

On the other hand, upon determining that the termination type is "aborted", the server 31 confirms progress information contained in the command received in step S2401 (S2402) and determines whether the progress satisfies the advancing condition in the activity error definition table (S2403). The detailed determination method has been described above with reference to FIG. 6, and a description thereof will not be repeated.

Upon determining in step S2403 that the progress does not satisfy the advancing condition, the server 31 selects, from the activity error definition table, the second message to be transmitted when the advancing condition is not satisfied, and transmits the message to the device of the transmission source of the command in step S2401 (S2404).

Upon determining in step S2403 that the progress satisfies the advancing condition, the server 31 selects, from the activity error definition table, the first message to be transmitted when the advancing condition is satisfied, and transmits the message to the device of the transmission source of the command in step S2401 (S2405). After that, the server 31 determines, based on the activity error definition table, the presence/absence of a message to be transmitted succeedingly (S2406) and transmits the next message in accordance with the determination result in step S2406 (S2407).

A normal print device simply displays, on its display unit, a message "Add printing paper" when the paper has run out. However, this message is not appropriate for the operation in the workflow because preprinted paper having ruled lines printed in advance may be used as in this example, or the contents may require a change in accordance with the operation. According to the present invention, even when only part of a product generated by an activity can advance to the processing of the next activity, an appropriate instruction can be given to the operator.

Although not illustrated in the example, the server may also transmit the workflow name, operation name, and information representing that the processing is in progress to the device in step S74.

<Activity Resuming Procedure by Alternative Device>

Figure 9:
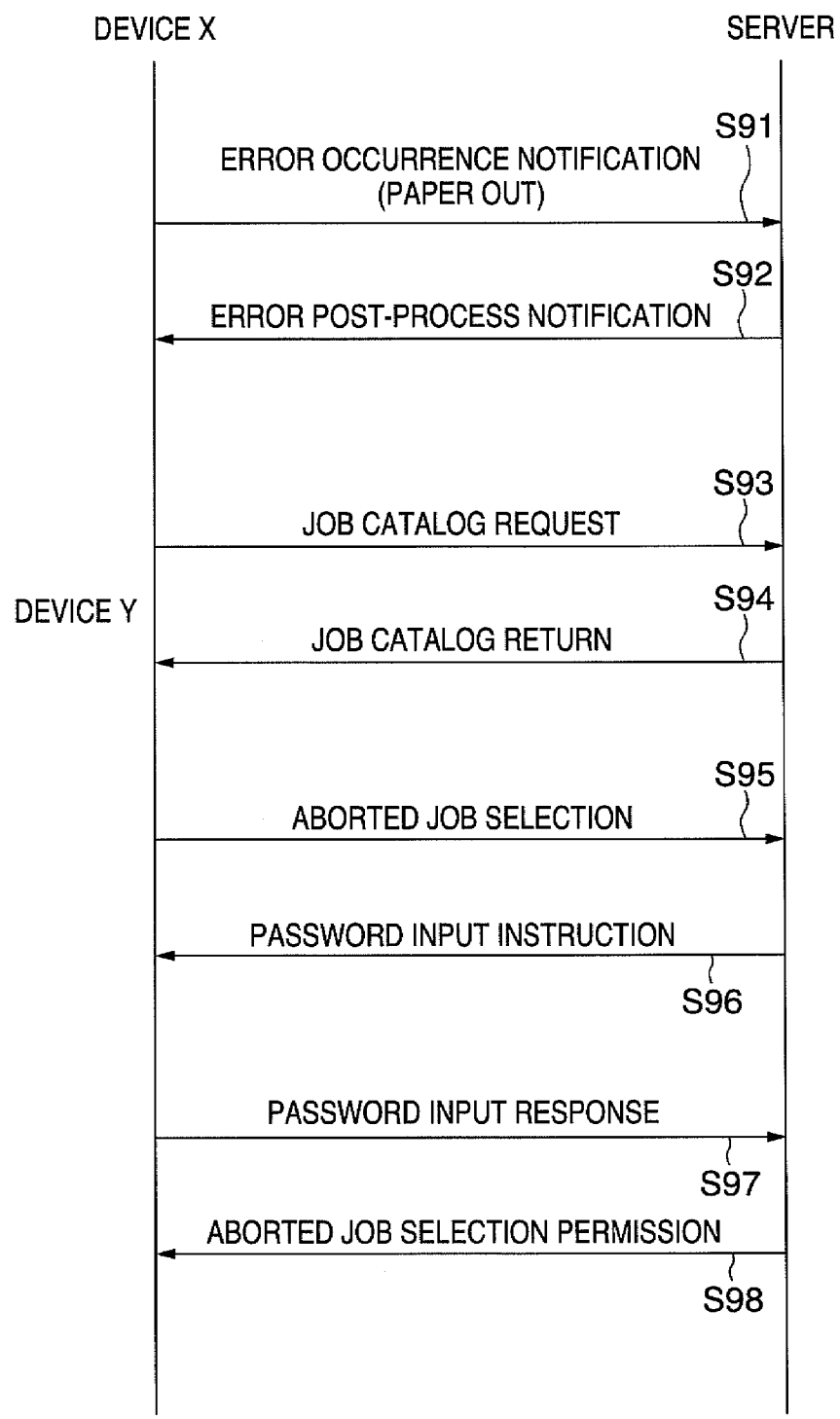
FIG. 9 is a sequence chart showing the communication sequence between the device and the server in resuming an aborted job.

FIG. 9 is a sequence chart showing the communication sequence between the device and the server in resuming an aborted job. FIG. 9 shows an example different from the procedures shown in FIGS. 6, 7, and 8. That is, the procedure shown in FIG. 9 uses an activity error definition table shown in FIG. 13.

FIG. 13 is a view showing an example of designation of a variable printer name and a variable password in an activity error definition table. Items 1301 to 1305 are equivalent to the items 61 to 65 in FIG. 6. A field 1306 indicates server processing in normal termination. A field 1307 indicates processing when a "paper out" error has occurred. When the termination type 1301 of the error indicates the "paper out" 1307, the activity is managed by the print workflow management server 31 as an aborted job without advancing to the activity of the next stage. To display a message "Go to device % D to output. The Password is % P", the print workflow management server stores the messages in a table. The server sets appropriate values in variable character strings % D and % P. The server sets a character string in % P by assigning an appropriate value to % P. The password is sent to the device and stored in the information of the activity in progress. The server determines a printer by determining % D in accordance with the sequence in FIG. 15. The character string of the printer name is substituted into % D and sent to the device. When the print workflow management server 31 has the arrangement shown in FIG. 13, it is unnecessary to acquire a printer name in designing a workflow. It is possible to store a general-purpose message and automatically cope with a change of the usable printer.

When a "paper out" error has occurred in a device X, the device X sends an error occurrence notification to the server in step S91 in FIG. 9. This process is the same as in step S75. Upon receiving the error occurrence notification in step S91, the server changes the status of the job held in the workflow to "aborted" and executes alternative device selection processing. This processing will be described later with reference to FIGS. 15 to 18. Based on selected alternative device candidates, the server transmits an error post-process notification to the device in step S92. The error post-process notification contains the message shown in FIG. 13. The processes in steps S91 and S92 are the same as those in steps S75 and S76 in FIG. 7 except the error that has occurred and the activity error definition table. In the notification transmitted in step S92, % D and % P of "Go to device % D to output. Password is % P" are converted into messages expanded in the server. A device name except the device X included in the role of the activity replaces "% D". In step S92, the server determines a specific device name to replace "% D". In this example, the role includes a device Y. Hence, the processing from step S93 is executed between the server and the device Y of devices which are displayed on the device X as "% D".

In step S93, the device Y transmits a job catalog request (or job request) to the server. In this example, the device Y continuously executes the job that has been aborted in the device X. In step S94, the server returns a catalog of jobs processable by the device Y. The job catalog includes the work items of activities which have been aborted in the device X and determined to be continuously executable by the device Y, and their job information. In step S95, the device Y selects an aborted job from the catalog and inquires of the server whether it can execute the operation of the job. In step S96, the server confirms the authority of the device Y for the aborted job and instructs the device Y to input the password. In step S97, the device Y transmits the password input by the user to the server. If the password sent in step S97 matches a password stored in advance, the server sends a selection permission to the device in step S98, thereby permitting the device Y to execute the operation. FIG. 9 illustrates only the sequence of the normal system. If an error has occurred, an appropriate command such as "The password is wrong" or "You have no access authority to the job" is sent from the server to the device so that the user can recognize it.

FIGS. 10A and 10B show a display example in resuming an aborted job. Display examples 1001 and 1002 are displayed on the device X. Display examples 1003 and 1004 are displayed on the device Y. The display 1001 is equivalent to the display 83 and contains a message representing that processing is in progress. When a failure has occurred, the device X transmits an error occurrence notification in step S91 and receives an error post-process notification in step S92. The display example 1001 transfers to the display example 1002. In the display example 1002, the server substitutes appropriate character strings to % D and % P of "Go to device % D to output. Password is % P". In this example, "device % D" is the Y printer, and "password % P" is 4567. When the user presses the OK button in the display 1002, the display on the device X changes to that in the idle state. Alternatively, if the job is aborted due to an error and remains partially unexecuted, a message requesting error removal is displayed.

The display examples 1003 and 1004 are displayed in causing the device Y to print the aborted job. The display example 1003 indicates catalog display. Four jobs are currently displayed. Assume that the user selects a job with an ID "10" whose status is "aborted". When the user presses the selection button of the job, a job selection notification (command) representing the selection of the aborted job is transmitted in step S95. The device Y receives a password input request transmitted from the server in step S96 and displays the password input screen of the display example 1004. When the user presses the OK button using a key of the device, the device issues a password input response to the server in step S97. If it is determined by authentication in the server that the passwords match, the server transmits a job selection permission notification to the device in step S98. Then, the device Y prints the aborted job.

"Status" of the items displayed in the job catalog of the display example 1003 will be described. In this example, four kinds of statuses can be displayed.

FIG. 11 is an explanatory view of the statuses to be displayed on the panel of the device. A status 1102 is "normal". The "normal" status indicates that no error has occurred up to the activity (i.e., job) in the workflow, or even if an error has occurred, the job has been normally resumed. A status 1103 is "aborted". The "aborted" status indicates that the processing of the activity which has been executed by another device is aborted. A status 1104 is "printing". The "printing" status indicates that another device is currently executing the activity. A status 1105 is "processing". The "processing" status indicates that this device is currently executing the activity. In this embodiment, a job in the "normal" status 1102 or "aborted" status 1103 can be selected and processed. In step S95 in FIG. 9, a job in the aborted "status" is selected.

In this embodiment, activities in the "printing" or "processing" status are also displayed. However, since these activities are unselectable, the server side may exclude them from the processable job catalog, or the client side may inhibit display of them.

<Device Management Table>

FIG. 14 shows an example of a device management table 1400 managed by the device management unit 38 of the print workflow management server 31. The device management table 1400 is also used in processing illustrated by a flowchart in FIG. 15 to be described later. A management device field 1401 shows the device names (identifiers) of management target devices. An IP address field 1402 stores the IP addresses of the devices. A remaining paper count field 1403 stores the remaining number of printing paper sheets set in each management target device. A schedule of use field 1404 stores the schedule use of each management target device. A detail field 1405 stores the description of each management target device. In this example, two device fields 1406 and 1407 are registered in the device management table 1400 as management target device fields. The device field 1406 describes the information of an A print device. The IP address of the A print device is 172.20.20.20, and the remaining number of paper sheets is 540. The schedule of use includes reservations "9/20, 13:00 to 16:00", "9/21, 15:00 to 17:00", and "9/21, 18:00 to 22:00". A description "machine in 2F room" is stored as detailed information. The device field 1407 describes the information of a B print device. The IP address of the B print device is 172.20.20.21, and the remaining number of paper sheets is 100. The schedule oh use includes a reservation "9/20, 13:00 to 16:00". A description "no operation panel" is stored as detailed information. The device management table registers information not only about devices such as printers and MFPs which execute the activities of a workflow but also about any devices usable by the print workflow management server 31. The device management table may register information not only about devices connected to the print workflow management server 31 via the network but also about off-line devices.

Figure 15:
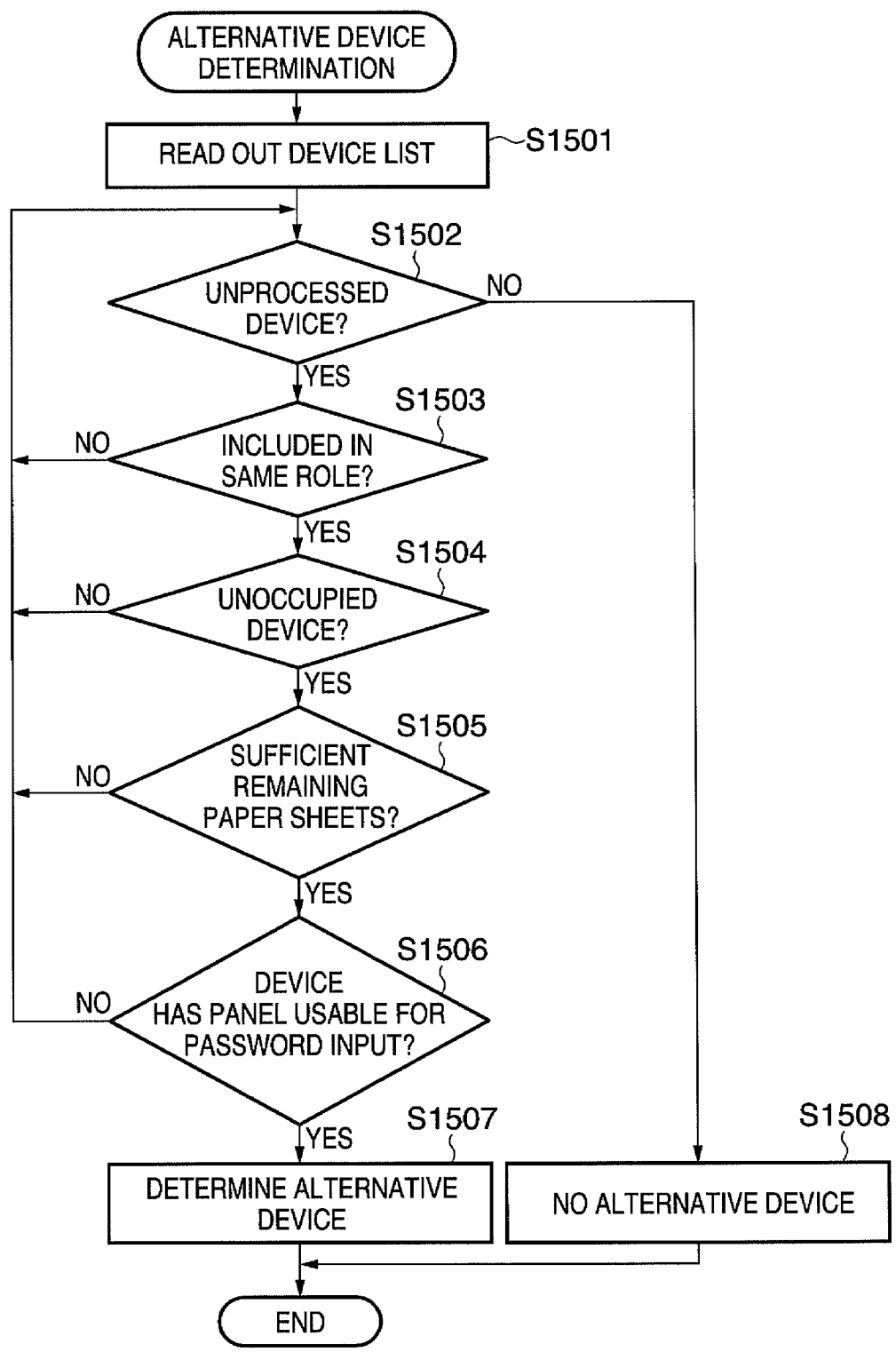
FIG. 15 is a flowchart illustrating the control sequence in the server in determining an alternative device for an aborted job.
Figure 16:
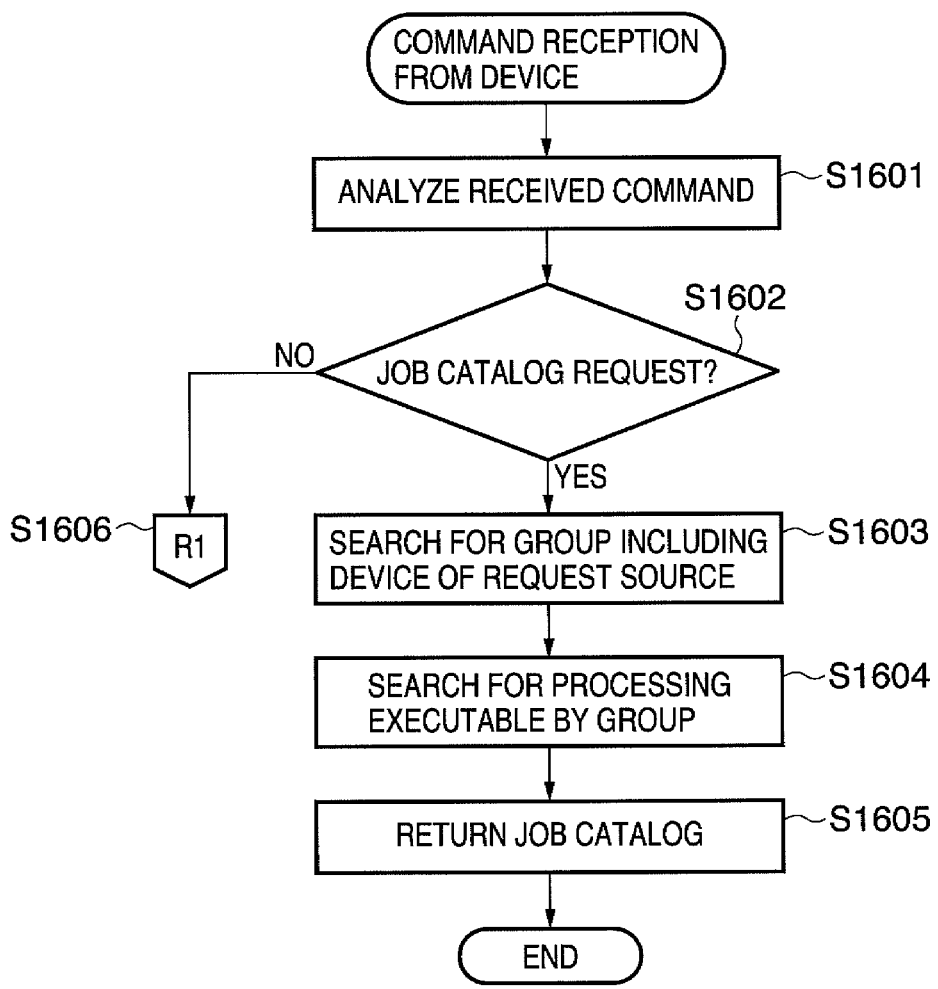
FIG. 16 is a flowchart illustrating the transition sequence upon command reception by the server according to the present invention.

The print workflow management server 31 manages the device information so that effective information can be obtained in determining an alternative machine for an aborted activity. FIG. 15 illustrates an alternative machine determination sequence. In this example, the print workflow management server 31 manages the remaining number of paper sheets. The remaining number of paper sheets may be managed for each paper size. Managing the remaining number of paper sheets for each paper size enables determining an alternative machine in consideration of the paper size used in a workflow. The remaining number of paper sheets or use schedule changes every time a device is used. Hence, the print workflow management server 31 requests information representing the state of the device and updates the device management table in accordance with the received state information. If an off-line device is registered in the device management table, it is difficult to update the frequently changing device state in real time. Hence, an off-line device such as a scanner or a bookbinding device which uses no consumables is preferably registered in the device management table.

<Command Processing in Server>

FIGS. 16 to 20 illustrate the transition sequence upon command reception by the server according to the present invention. In step S1601, the print workflow management server 31 analyzes a command received from the device. The analysis target of the print workflow management server 31 in step S1601 includes the messages received in steps S71, S73, S75, S91, S93, S95, and S97. In step S1602, the print workflow management server 31 determines whether the received command is a job catalog request. If YES in step S1602, the process advances to step S1603. Otherwise, the process advances to step S1606.

In step S1603, the print workflow management server 31 searches for a group to which the device of the job catalog request source belongs. In step S1604, the print workflow management server 31 searches for activities currently executable by one or a plurality of groups found in step S1603. For a currently executable activity, the workflow has been completed up the immediately preceding activity, and a work item has already been generated. Additionally, the found group is defined as the role of the activity. Hence, in step S1604, the print workflow management server 31 searches for a work item whose state is "INIT". In step S1605, the print workflow management server 31 returns found work items to the device of the command transmission source as a job catalog.

Figure 17:
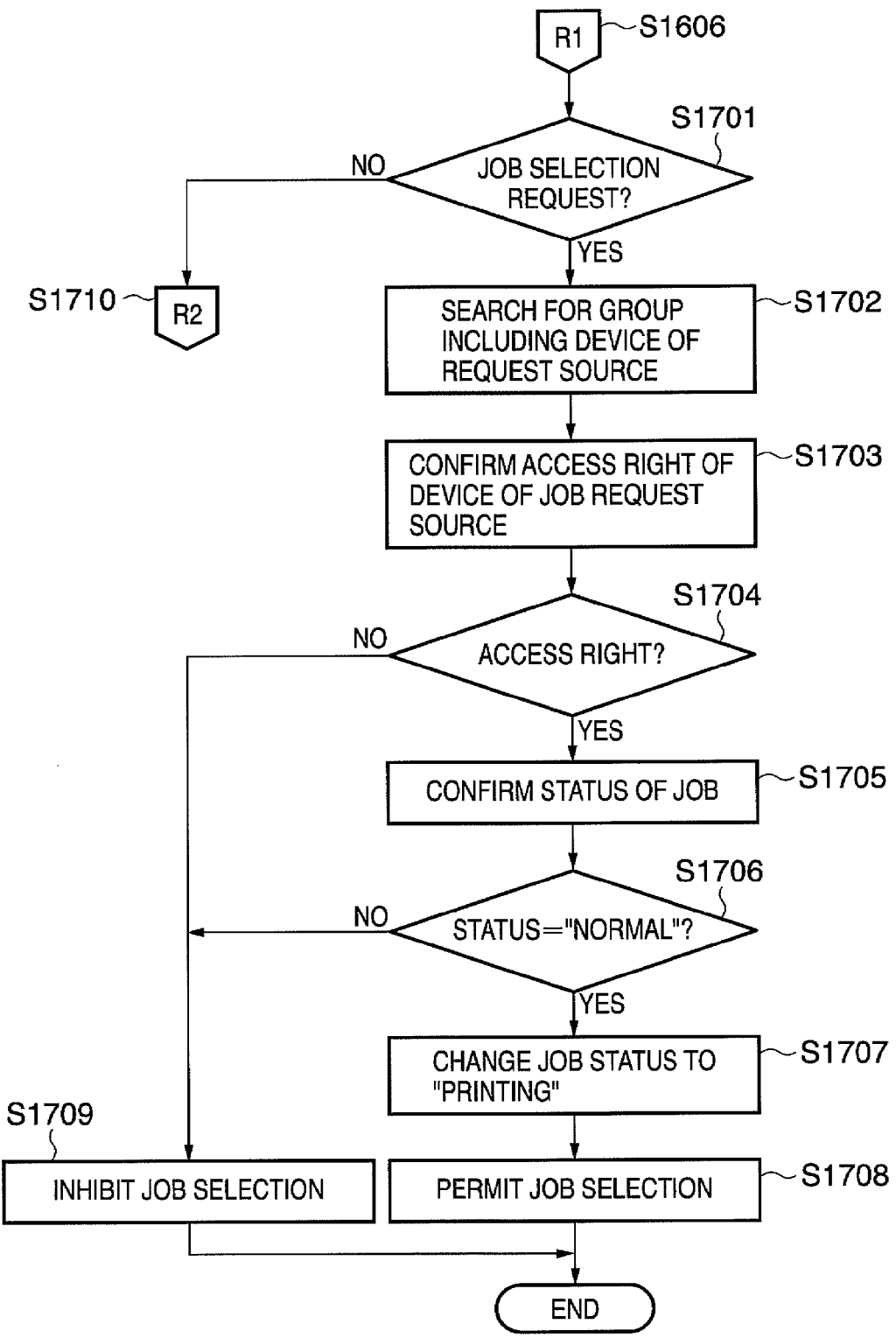
FIG. 17 is a flowchart illustrating the transition sequence upon command reception by the server according to the present invention.

Processing from step S1606 will be described with reference to FIG. 17. If the command is not the job catalog request, in step S1701, the print workflow management server 31 determines whether the command received from the device is a job selection request. A job selection request is issued to notify the server that the user has selected a specific job from the job catalog displayed on the panel of the device. If the print workflow management server 31 determines that the command is a job selection request, the process advances to step S1702. Otherwise, the process advances to step S1710.

In step S1702, the print workflow management server 31 searches for a group to which the device of the command transmission source belongs. The device may belong to a plurality of groups. In step S1703, the print workflow management server 31 determines whether the group found in step S1702 has access authority to the activity (i.e., job) designated in the received command. Normally, the process advances to step S1702 via steps S1603 to S1605. Hence, the selected job corresponds to an activity for which the group including the device of the command transmission source is designated as the role. Hence, the device of the command transmission source has access authority to the selected job. However, the print workflow management server 31 determines the access right because, for example, a malicious user may transmit a message as if he/she have selected a job which is not so much as displayed. In step S1703, the print workflow management server 31 confirms the access right of the device of the command transmission source. If the device has no access right, the process advances to step S1709. If the device has access authority, the process advances to step S1705.

In step S1705, the print workflow management server 31 confirms the status of the selected job and determines whether the status is "normal" (S1706). Since a plurality of devices can execute one job, the determination in step S1706 is done so as to cause a device to exclusively execute the job. A job which is already in progress has a status such as "printing". If the status of the job selected in step S1705 is not "normal" (NO in step S1706), the job cannot be processed because any other device is already executing it. For this reason, the process advances to step S1709. If the status is "normal", the process advances to step S1707. In step S1707, the print workflow management server 31 changes the job status to "printing". In step S1708, the print workflow management server 31 returns selection permission in response to the job selection request. Step S74 in FIG. 7 corresponds to step S1708. In step S1709, the print workflow management server 31 returns a selection inhibition to the device. In this example, processing is a status displayed for a job that is being processed by the device itself. The status of a job managed by the server is "printing".

Figure 18:
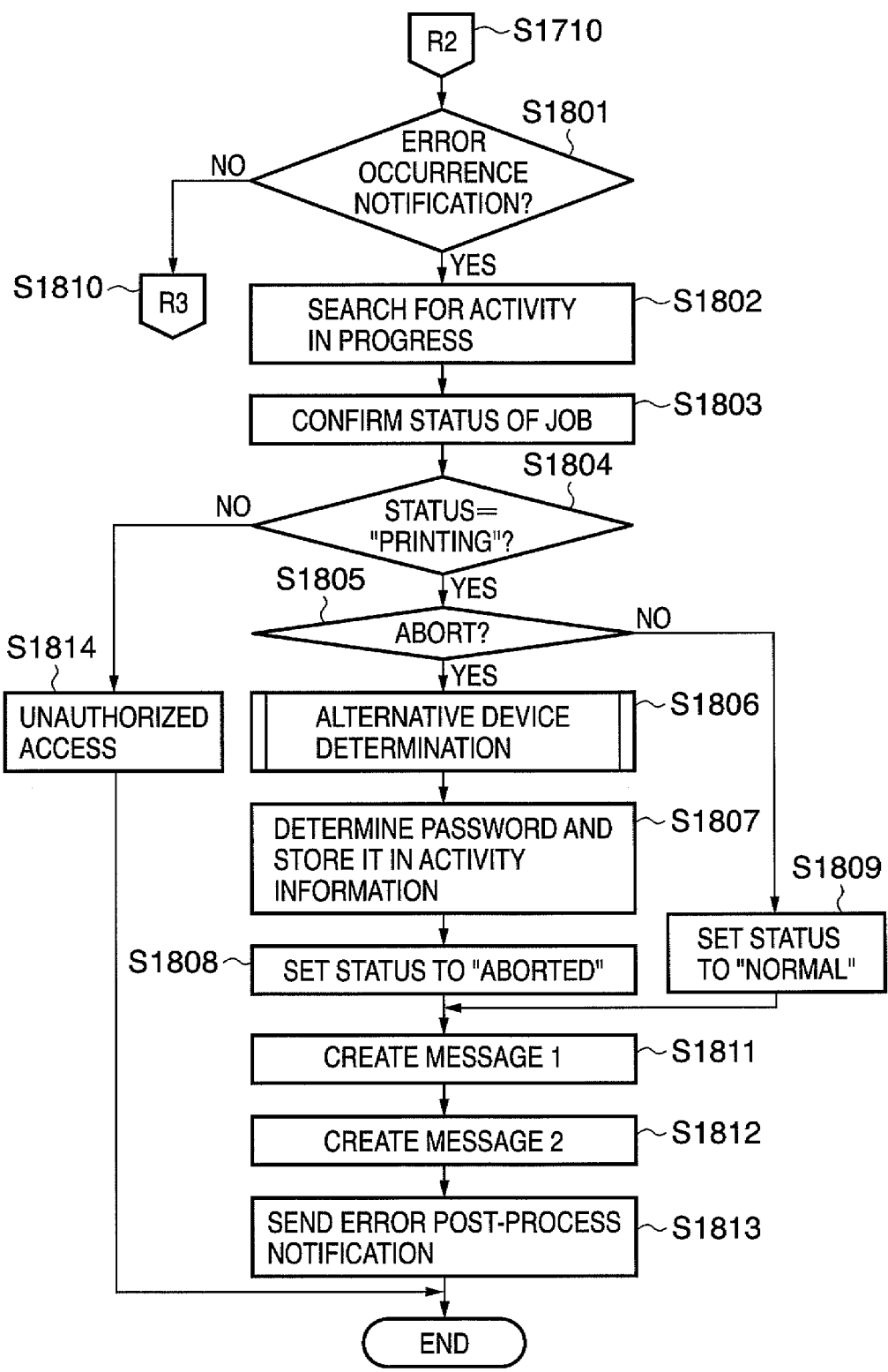
FIG. 18 is a flowchart illustrating the transition sequence upon command reception by the server according to the present invention.

Processing from step S1710 will be described with reference to FIG. 18. In step S1801, the print workflow management server 31 determines whether the received command is an error occurrence notification from the device. If YES in step S1801, the process advances to step S1802. Otherwise, the process advances to step S1810. In this example, the device notifies the server of even normal termination of an activity using the error occurrence notification. That is, the termination type of the error occurrence command includes normal termination.

In step S1802, the print workflow management server 31 searches for a corresponding activity based on the work item number contained in the received command. In step S1803, the print workflow management server 31 obtains a corresponding job from the found activity and confirms (refers to) the status of the job. In step S1804, the print workflow management server 31 determines whether the job status is "printing". If YES in step S1804, the process advances to step S1805. Otherwise, the process advances to step S1814. In step S1805, the print workflow management server 31 determines whether to abort the activity associated with the error notification. The print workflow management server 31 executes the determination processing in step S1805 based on the advancing condition corresponding to the termination type contained in the received error notification and the progress contained in the error notification by referring to the activity error definition table. If the progress does not satisfy the advancing condition, or no advancing condition is defined in step S1805, the print workflow management server 31 determines that the activity should be aborted. If the print workflow management server 31 determines abortion, the process advances to step S1806. If the print workflow management server 31 does not determine abortion, the process advances to step S1809 to set "normal" as the job status.

In step S1806, the print workflow management server 31 determines an alternative printer in resuming the aborted job. This processing will be described later in detail with reference to FIG. 15. Step S1806 corresponds to the alternative device selection step and the alternative device selector. In step S1807, the print workflow management server 31 determines a password which should be displayed on the panel in aborting the job and input by the user in resuming the job. The password is stored in the activity information. In step S1808, the job status is set to "aborted".

In step S1811, the print workflow management server 31 creates a message. If a message contains % D or % P, it is converted into a name or value determined in step S1806 or S1807. The message is stored as a notification parameter. In step S1812, message 2 is stored as a notification parameter, as in step S1811. In step S1813, the print workflow management server 31 sends the messages stored in steps S1811 and 1812 as parameters. In step S1814, the print workflow management server 31 determines that the access from the device is not normal and returns, to the device, a notification representing that the access is unauthorized. Upon receiving the unauthorized access response from the server, the device controls to output a message such as "Operation of the selected job is inhibited now". Alternatively, the server side may store, in the activity error table, a message to be displayed on the device in case of unauthorized access and put the message in the response field of the error occurrence notification command.

<Alternative Device Selection>

FIG. 15 is a flowchart illustrating the control sequence in the server in determining an alternative device for an aborted job. The procedure in FIG. 15 explains details of step S1806 in FIG. 18.

In step S1501, the server loads, to the memory, the device management table 1400 managed by the device management unit 38. In step S1502, the server determines whether unprocessed device information is managed in the device management table 1400. If unprocessed device information exists, the device information is specified as device information of interest, and the process advances to step S1503. A device associated with the device information of interest is called a device of interest. If no unprocessed device information exists, the process advances to step S1508.

In step S1503, the server determines whether the device of interest is included in the role of the aborted activity. For example, when the printing activity 44 in FIG. 4 is aborted, the server determines whether the device of interest is included in the X printer group that is the role of the activity 44. That is, a condition of an alternative device is that the device of interest is included in the role configuration table in FIG. 5.

In step S1504, the server determines whether the device of interest is unoccupied. A device that is currently being used cannot be selected as an alternative device. The server also determines whether the use schedule of the device of interest conflicts with the reservation schedule 1404 in consideration of the time until all the remaining paper sheets of the printing step are printed and, if possible, the time until the operator starts the operation of the device. For example, if the alternative device should print the remaining paper sheets, the expected start time and expected end time of the alternative processing are obtained based on the remaining number of paper sheets of the job, the capability of the device of interest, the installation location of the device of interest, and the like. If the reserved period described in the use schedule field of the device management table 1400 does not overlap the expected use period, the device of interest is selected as an alternative device candidate. In this case, the process advances to step S1505. If the device of interest is busy, the process returns to step S1503 to place focus on the next device.

In step S1505, the server determines whether the device of interest has sufficient remaining paper sheets. The number of paper sheets remaining in the device of interest is compared with the remaining number of paper sheets of the aborted printing activity. If the former is larger, the server determines that the device has sufficient remaining paper sheets. If the device of interest has sufficient remaining paper sheets, it is selected as an alternative device candidate. The process advances to step S1506. Otherwise, the process returns to step S1502.

In step S1506, the server determines the arrangement of the device. If the device of interest has an operation panel to be used to input a password and the like, the process advances to step S1507. Otherwise, the process returns to step S1502. In step S1507, the server determines, as the alternative device, the device of interest which satisfies all conditions in steps S1503 to S1506 and stores the device ID or device name. In step S1508, since no device to be read out succeedingly exists, the server selects a message representing that no alternative device exists. A thus determined device name (ID) is displayed in the display example 1002 in FIG. 10A.

In obtaining an alternative device, it is possible to select a device suitable for alternative processing by referring to the processing step information of the processing step during which the error has occurred in the device that has been executing the activity and the device information of the management target device. Note that the processing step information indicates the processing contents of the processing step. That is, one of the conditions the alternative device must satisfy is that the device has a function of executing the processing contents of the processing step.

If no appropriate alternative printer is found, the server outputs, to the device, a message such as "No alternative printer is found. Please select a printer again after recovery" in place of the message "Go to device % D to output. The Password is % P".

Figure 19:
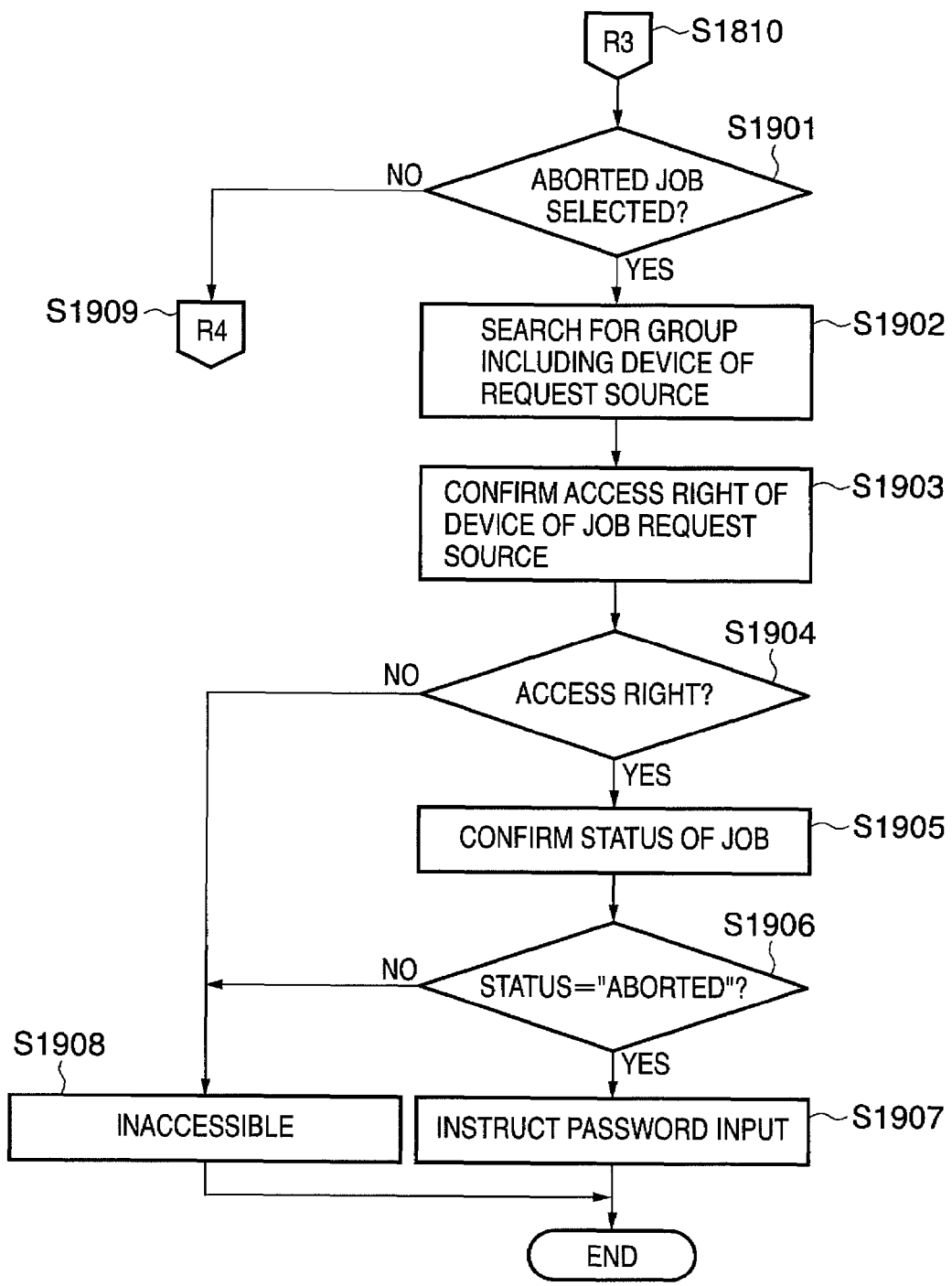
FIG. 19 is a flowchart illustrating the transition sequence upon command reception by the server according to the present invention.

Processing from step S1810 will be described next with reference to FIG. 19. In step S1901, the server determines whether the command transmitted from the device is an aborted job selection command. When the user selects a job (called an aborted job) whose status is "aborted" from the selectable job catalog displayed on the panel of the device, an aborted job selection command is transmitted. This processing corresponds to step S95. If the server determines that the command is an aborted job selection command, the process advances to step S1902. Otherwise, the process advances to step S1909. In step S1902, the server searches for a group to which the device of the command transmission source belongs. The device may belong to one or a plurality of groups. In steps S1903 and S1904, the server determines whether the device of the command transmission source has access authority to the selected job. If the server determines that the device has access authority, the process advances to step S1905. Otherwise, the process advances to step S1908.

In step S1905, the server confirms the status of the job. In step S1906, the server determines whether the status is "aborted". If the status is not "aborted", the status of the selected job does not match the aborted job selection command, and the process advances to step S1908. If the server determines that the status of the selected job is "aborted", the status matches the command, and the process advances to step S1907 to issue a password input instruction command to the device. This processing corresponds to step S96. In step S1908, the server notifies the device that it cannot access the job. Upon receiving an unauthorized access response from the server, the device controls to output a message such as "Operation of the selected aborted job is inhibited now".

Figure 20:
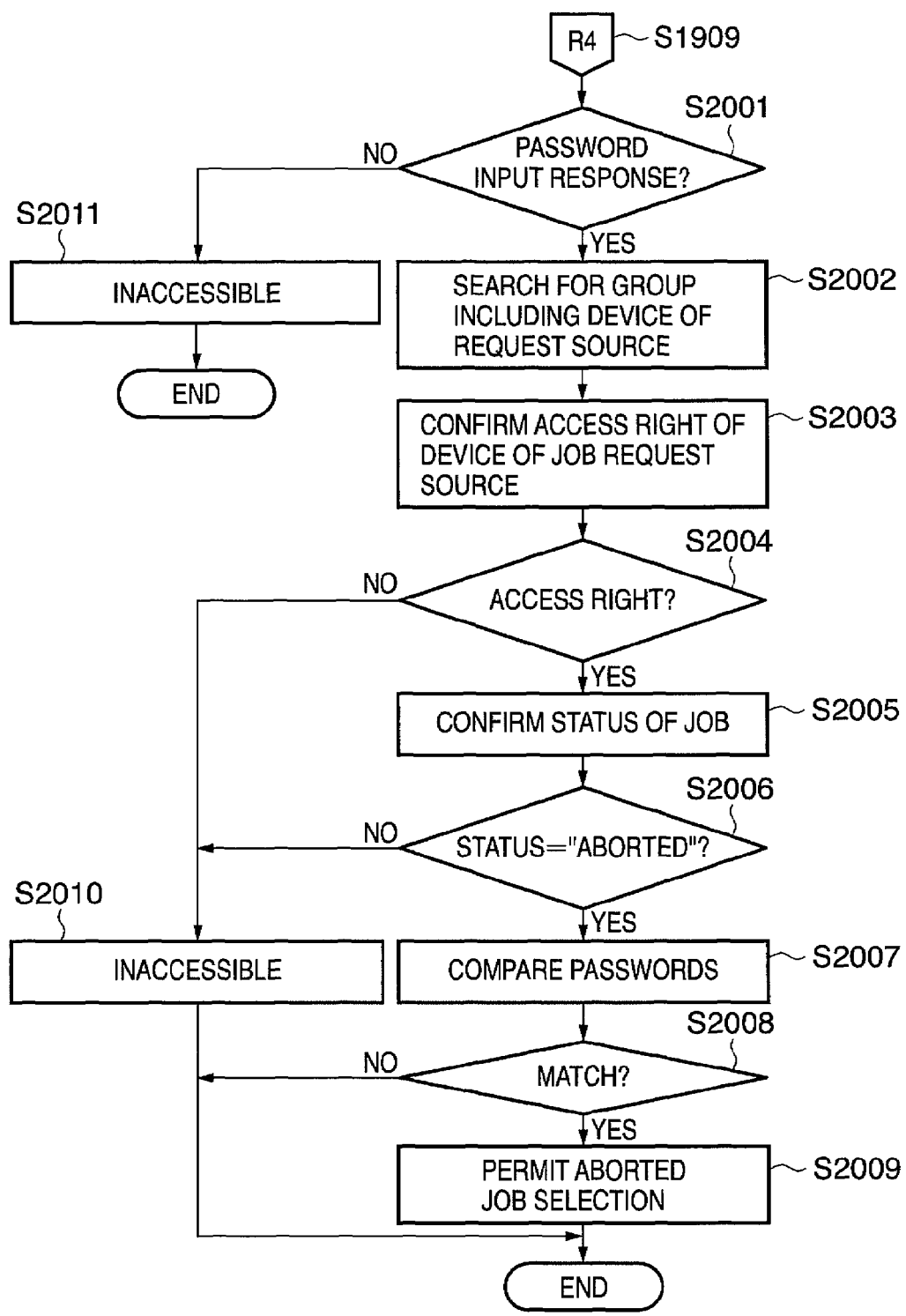
FIG. 20 is a flowchart illustrating the transition sequence upon command reception by the server according to the present invention.

Processing from step S1909 will be described next with reference to FIG. 20. In step S2001, the server determines whether the received command is a password input response command. That is, the print workflow management server 31 determines whether a password input via the operation screen of the device is received. If the server determines that the command is not a password response command, the command cannot be handled by the server. The process advances to step S2011 to notify the device that it cannot access the job, and the processing is ended. If the server determines in step S2001 that the command is a password input response command, the process advances to step S2002.

In step S2002, the server searches for a group to which the device of the command transmission source belongs. In step S2003, the server determines whether the device of the password transmission source has access authority to the aborted job. If the server determines in step S2004 that the device has access authority, the process advances to step S2005. Otherwise, the process advances to step S2010.

In step S2005, the server confirms the status of the job. If the server determines in step S2006 that the status of the job is "aborted", the process advances to step S2007. Upon determining that the status is not "aborted", the server issues a notification to the device to notify it that it cannot access the job. In step S2007, the server compares the password contained in the password input response command with the password stored in the activity information in step S1807.

If the passwords match each other as a result of comparison, the process advances to step S2009. Otherwise, the process advances to step S2010 to notify the device that it cannot access the job. Since the passwords match, the server transmits aborted job selection permission S98 to the device.

The above-described procedure allows the print workflow management server 31 to display an appropriate instruction on the device for the operator if a failure has occurred in the print device for executing a printing activity. Hence, if the workflow can be continued without waiting for recovery, the server can instruct the procedure for the operator to continue the workflow. This improves the productivity of the workflow.

<POD Workflow and Work Item>

FIG. 21 is a schematic view of work items in a POD workflow. A description will be made below with reference to FIG. 21. A work item 2101 indicates that the activity 42 has terminated processing. The work item number is 80210. The role is a software group A designated by the workflow editor. As the executor, the name "Gold" of a PC which has executed image conversion is stored. The status indicates "complete". A work item 2102 indicates that the activity 43 has terminated processing. The work item number is 80212. The role is a software group B designated by the workflow editor. As the executor, the name "Silver" of a PC which has executed imposition is stored. The status indicates "complete". A work item 2103 indicates that the activity 44 has been activated and is waiting for an operation. The work item number is 80219. The role is a printer group X. The executor is undefined. The status indicates "INIT". The executor is undefined because it is set when the operation is executed. In the workflow 41, the first two of the four activities have already terminated. The workflow is presently waiting for execution of the activity 44. When a device of the printer group X issues the job catalog request S71 in this state, these work items are returned to the device as the job catalog S72. Unlike a work item, a job represents the state of an entire workflow. Reference numeral 2104 denotes the structure of the job. The job includes a job number "90010", a page pointer to, for example, a print image, and a processing step portion 21041 representing the activity which is currently in progress in the workflow. In this example, the processing step portion 21041 indicates printing, and the step 44 is waiting for execution. A status 21042 is "normal". This is one of the statuses 1102 to 1105 shown in FIG. 11. No error has occurred at present.

Even the POD workflow is designed to generate work items associated with roles, as in FIGS. 1 and 2.

Figure 22:
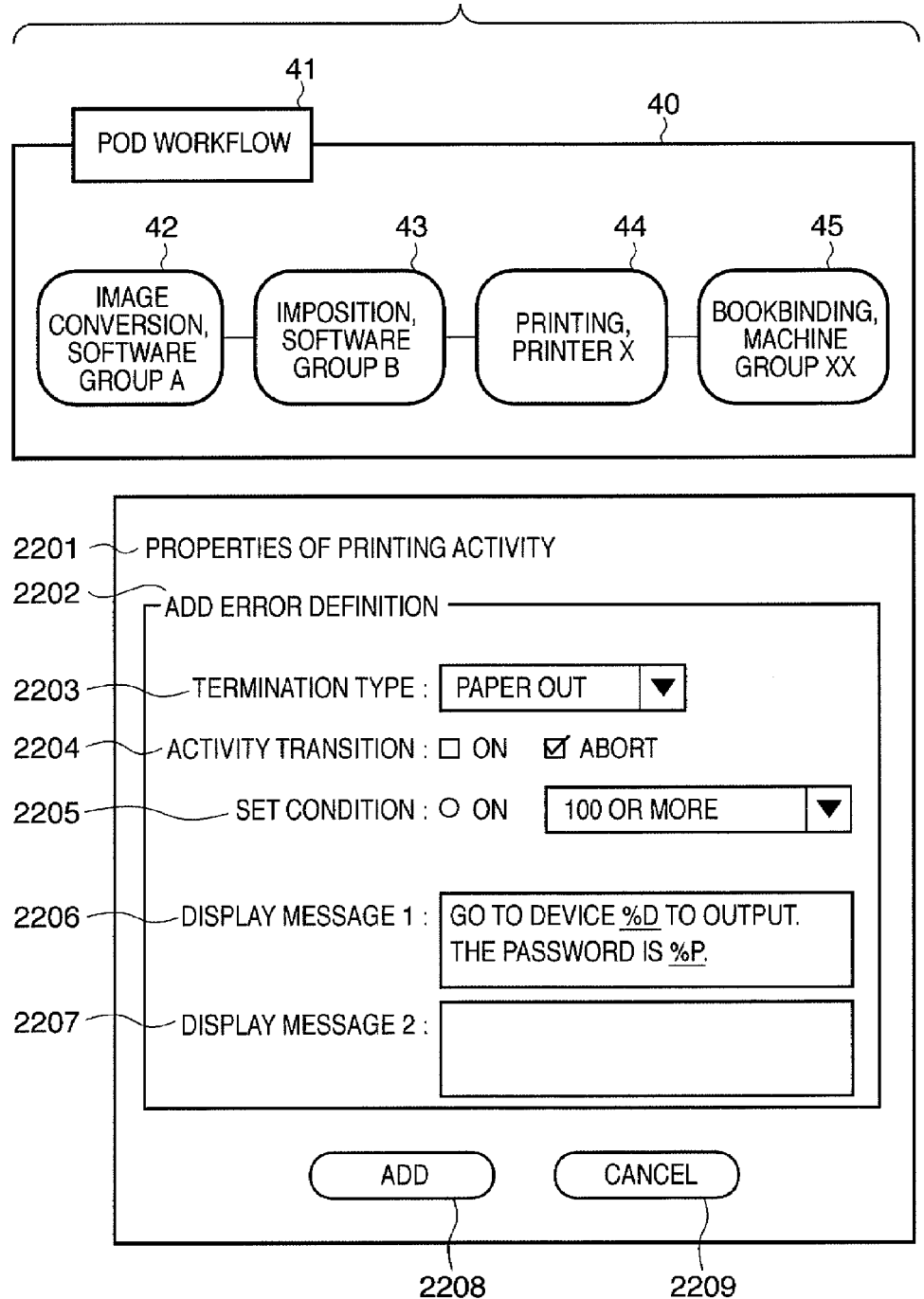
FIG. 22 is a view showing an example of a user setting screen in defining an activity error.

FIG. 22 shows an example of a user setting screen in defining an activity error. A detailed description will be made below with reference to FIG. 22. A workflow designer can easily create an activity error definition table as shown in FIG. 6. A workflow editor generates a desired flow by connecting activities by transitions (arrows) and associating an operation and a role with each activity. In this example, an error definition can be set in property setting of an activity. A screen 2201 is one of the property setting screens of the activity 44. The user adds an error definition in an error definition area 2202. A termination type selection portion 2203 selects a termination type. "Paper out" is currently selected. The user can select another type from the combo box. An activity transition selection field 2204 is a selection portion related to activity transition. In selecting activity transition, whether to abort an activity or advance to the activity of the next stage can be selected. Whether to allow activity transition can be selected in accordance with the termination type selected in the termination type selection portion 2203. To advance to the next activity, the user selects "ON". To handle the activity as an aborted job, the user selects "abort". To inhibit activity transition, the user selects neither check box. A condition setting portion 2205 is set to conditionally change the activity transition or a message to be displayed. To set a condition, the user sets the radio button "ON", inputs a number to the text field on the right side, and inputs an expression such as "or more" "or less" or "less than". A designation portion 2206 designates display message 1. A designation portion 2207 designates display message 2. The user selects a location using, for example, a mouse and inputs a text. The user presses a button 2208 to enable the settings and cause the activity management unit 36 of the server to manage them. The user presses a button 2209 to cancel registration. These settings can be done for each activity to execute display expected by the workflow manager.

<Another Example of Activity Error Definition Table>

FIG. 12 shows another example of the activity error definition table. This is an example of a printing activity error definition table for a workflow for executing bookbinding printing of 50 copies each including 10 paper sheets. Fields 1201 to 1205 are equivalent to the fields 61 to 65. A field 1206 indicates server processing in normal termination. In normal termination, the processing advance to the next activity. The server sends, to the device, a message "Place the printed product on shelf B" as display information. A field 1207 indicates the server operation in case of paper out. When a "paper out" error has occurred, the processing branches depending on whether 100 or more paper sheets have been printed. If 100 or more paper sheets have been output, the server determines that the processing can advance to the next bookbinding activity and advances the activity. At this time, two messages "Place pages 1 to 10×N of the printed product on shelf B, and keep the remainder on the tray" and "Supply A4 paper" are displayed. In the message, a character string generated by causing the server to substitute a calculated value into N is displayed. If the number of printed paper sheets is less than 100, the message "Supply A4 paper" is displayed without advancing the activity. When "toner out" 1208 is determined, the processing branches depending on whether 100 or more paper sheets have been printed, like "paper out". If 100 or more paper sheets have been output, the server determines that the processing can advance to the next bookbinding activity and advances the activity. At this time, the device-dependent message "Place pages 1 to 10×N of the printed product on shelf B, and keep the remainder on the tray" is displayed. In the message, a character string generated by causing the server to substitute a calculated value into N is displayed. If the number of printed paper sheets is less than 100, a device-dependent message is displayed without advancing the activity. The message can be, for example, "Supply toner" depending on the primary output function of the device. A field 1209 indicates the server operation when a jam has occurred. This table is designed not to advance the activity in case of a jam. Two messages "Clear jam" and "Print from the first page" are displayed. A field 1210 indicates server processing when the user has pressed a stop key. The processing assumes that print processing, scanner processing, or the like which is in progress can be aborted by pressing the stop key on the device. When the user has pressed the stop key, the server sends a message "Select a job again" to the device without advancing the activity. A field 1211 indicates server processing for a termination type except those described above. The server displays a message "Call the system administrator" without advancing the activity. In the example shown in FIG. 6, 15 paper sheets are bound into a book. In the example shown in FIG. 12, since 10 paper sheets are bound into a book, different contents are displayed on the device. It is also possible to easily add an error type such as "stop key press". The characteristic feature is that the message to be displayed on the device can be changed in accordance with the workflow.

FIG. 23 shows an activity error definition table in the printing activity of a workflow for printing 10,000 pages in one job. Fields 2301 to 2305 are equivalent to the fields 61 to 65. A field 2306 indicates the server operation in normal termination. The table is designed to display a message "Save the printed product on shelf YYY". A field 2307 indicates the server operation in case of paper out. The same message as in the normal termination 2306 is displayed without activity transition. In case of, for example, "paper out", normally, a message such as "Supply printing paper" is displayed as an error display on the device. However, in a job for printing, for example, 10,000 pages, printing paper sheets set in the device run out even in the normal operation. The present invention has an effect of inhibiting output of a message such as "Set printing paper" which is meaningless and wasteful in a certain kind of workflow.

According to the above-described embodiment, the following effects can be obtained.

(1) It is possible to output an error code suitable for a processing result or progress.

(2) It is possible to display a proper instruction on the device when a job is aborted. The aborted job can be resumed so that the printing paper sheets and output time can be prevented from being wasted.

(3) Any operator other than the administrator can monitor jobs and effectively use unoccupied devices.

(4) Since it is possible to place a limitation on devices capable of executing a workflow activity, the operability for the workflow creator increases.

(5) It is possible to prevent any failure such as redundant printing by inhibiting another device from executing an activity in progress.

(6) It is possible to save the time for searching for a device capable of continuing processing.

The present invention is also applicable to a system including a plurality of devices (for example, host computer, interface device, reader, and printer) or an apparatus (for example, copying machine or facsimile apparatus) including a single device. The object of the present invention is achieved even by supplying a recording medium which records program codes for implementing the functions of the above-described embodiment to the system or apparatus and causing the computer of the system or apparatus to read out and execute the program codes stored in the storage medium. In this case, the program codes read out from the storage medium implement the functions of the above-described embodiment by themselves, and the program codes themselves and the storage medium which stores them constitute the present invention.

The present invention also incorporates a case in which the functions of the above-described embodiment are implemented by causing the operating system (OS) running on the computer to partially or wholly execute actual processing based on the instructions of the program codes. The present invention is also applicable to a case in which the program codes read out from the storage medium are written in the memory of a function expansion card inserted into the computer or a function expansion unit connected to the computer. In this case, the CPU of the function expansion card or function expansion unit partially or wholly executes actual processing based on the instructions of the written program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-122796, filed May 7, 2007, which is hereby incorporated by reference herein in its entirety.

What is claimed is:

1. A workflow management server including a hardware processor, the server for managing a workflow including a plurality of processing steps to be sequentially executed by connected devices, comprising:

a receiving unit adapted to receive a progress of a processing step, wherein the progress includes a termination type of printing and the number of printed sheets;

a message selector adapted to select a first message representing advance to a next processing step and a second message to remove a cause of an abortion of the processing step, if the termination type indicates abortion of the processing step by an error of the device and the number of printed sheets satisfies a condition to advance to the next processing step, and to select the second message if the termination type indicates abortion of the processing step by an error of the device and the number of printed sheets does not satisfy the condition to advance to the next processing step, wherein the second message is displayed after a confirmation instruction for the first message is received if the first and second messages are selected;

a first transmitter adapted to transmit the message selected by said message selector to the device; and a storage adapted to store the first message and the second message which are transmitted when the termination type indicates abortion of the processing step, and a third message which is transmitted when the termination type indicates completion of the processing step, wherein the first message represents that a processed portion of the aborted processing step should advance to the next processing step, and the third message explains how to handle a processed portion of the completed processing step.

2. A workflow management method of managing a workflow including a plurality of processing steps to be sequentially executed by connected devices, comprising:

a receiving step of receiving a progress of a processing step, wherein the progress including includes a termination type of printing and the number of printed sheets;

a message selection step of selecting a first message representing advance to a next processing step and a second message to remove a cause of an abortion of the processing step if the termination type indicates abortion of the processing step by an error of the device and the number of printed sheets satisfies a condition to advance to a next processing step, and to select the second message if the termination type indicates abortion of the processing step by an error of the device and the number of printed sheets does not satisfy the condition to advance to the next processing step, wherein the second message is displayed after a confirmation instruction for the first message is received if the first and second messages are selected;

a first transmission step of transmitting the message selected in the message selection step to the device; and a storage step of storing the first message and the second message which are transmitted when the termination type indicates abortion of the processing step, and a third message which is transmitted when the termination type indicates completion of the processing step, wherein the first message represents that a processed portion of the aborted processing step should advance to the next processing step, and the third message explains how to handle a processed portion of the completed processing step.

3. A non-transitory computer-readable recording medium recording a program which causes a computer to perform a management method of managing a workflow including a plurality of processing steps to be sequentially executed by connected devices, the method comprising:

a receiving step of receiving a progress of a processing step, wherein the progress including includes a termination type of printing and the number of printed sheets;

a message selection step of selecting a first message representing advance to a next processing step and a second message to remove a cause of an abortion of the processing step if the termination type indicates abortion of the processing step by an error of the device and the number of printed sheets satisfies a condition to advance to a next processing step, and to select the second message if the termination type indicates abortion of the processing step by an error of the device and the number of printed sheets does not satisfy the condition to advance to the next processing step, wherein the second message is displayed after a confirmation instruction for the first message is received if the first and second messages are selected;

a first transmission step of transmitting the message selected in the message selection step to the device; and a storage step of storing the first message and the second message which are transmitted when the termination type indicates abortion of the processing step, and a third message which is transmitted when the termination type indicates completion of the processing step, wherein the first message represents that a processed portion of the aborted processing step should advance to the next processing step, and the third message explains how to handle a processed portion of the completed processing step.

* * * * *